United States Patent
Lim et al.

(10) Patent No.: US 9,571,841 B2
(45) Date of Patent: Feb. 14, 2017

(54) METHOD AND DEVICE FOR ENCODING/DECODING IMAGE

(71) Applicant: Electronics and Telecommunications Research Institute, Daejeon (KR)

(72) Inventors: Sung Chang Lim, Daejeon (KR); Hui Yong Kim, Daejeon (KR); Jin Ho Lee, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 14/382,251

(22) PCT Filed: Apr. 16, 2013

(86) PCT No.: PCT/KR2013/003203
§ 371 (c)(1),
(2) Date: Aug. 29, 2014

(87) PCT Pub. No.: WO2013/157825
PCT Pub. Date: Oct. 24, 2013

(65) Prior Publication Data
US 2015/0078442 A1    Mar. 19, 2015

(30) Foreign Application Priority Data

Apr. 16, 2012  (KR) .................. 10-2012-0039270
Apr. 16, 2013  (KR) .................. 10-2013-0041807

(51) Int. Cl.
*H04N 19/126* (2014.01)
*H04N 19/70* (2014.01)
(Continued)

(52) U.S. Cl.
CPC .......... *H04N 19/126* (2014.11); *H04N 19/129* (2014.11); *H04N 19/18* (2014.11);
(Continued)

(58) Field of Classification Search
CPC .................................................... H04N 19/126
(Continued)

(56) References Cited

U.S. PATENT DOCUMENTS

2007/0292039 A1    12/2007  Kadono et al.
2011/0110423 A1    5/2011   Kadono et al.
2014/0307782 A1*   10/2014  Shima .............. H04N 19/00042
                                                          375/240.03

FOREIGN PATENT DOCUMENTS

JP    2004-222288 A    8/2004
JP    2007-520948 A    7/2007
(Continued)

OTHER PUBLICATIONS

Bross B et al: "High Efficiency Video Coding (HEVC) text specification draft 6", No. m24004, Apr. 2, 2012 (Apr. 2, 2012).*
(Continued)

*Primary Examiner* — Yulin Sun
(74) *Attorney, Agent, or Firm* — NSIP Law

(57) ABSTRACT

A method and a device for encoding/decoding an image are disclosed. The method for decoding an image comprises the steps of: decoding information on a quantization matrix; and restoring the quantization matrix on the basis of the information on the quantization matrix, wherein the information on the quantization matrix includes information indicating a DC value of the quantization matrix and/or information indicating differential values of quantization matrix coefficients.

5 Claims, 17 Drawing Sheets

(51) Int. Cl.
*H04N 19/129* (2014.01)
*H04N 19/61* (2014.01)
*H04N 19/463* (2014.01)
*H04N 19/18* (2014.01)
*H04N 19/44* (2014.01)
*H04N 19/60* (2014.01)
*H04N 19/176* (2014.01)
*H04N 19/96* (2014.01)

(52) U.S. Cl.
CPC .......... *H04N 19/44* (2014.11); *H04N 19/463* (2014.11); *H04N 19/60* (2014.11); *H04N 19/61* (2014.11); *H04N 19/70* (2014.11); *H04N 19/176* (2014.11); *H04N 19/96* (2014.11)

(58) Field of Classification Search
USPC .................................................. 375/240.03
See application file for complete search history.

(56) References Cited

FOREIGN PATENT DOCUMENTS

| | | |
|---|---|---|
| JP | 2013-219727 A | 10/2013 |
| KR | 1997-0078642 A | 12/1997 |
| KR | 10-2007-0008476 | 1/2007 |
| KR | 10-2007-0115551 A | 12/2007 |
| KR | 10-2009-0027590 A | 3/2009 |
| KR | 10-2009-0068100 A | 6/2009 |
| KR | 10-1024282 B1 | 3/2011 |
| KR | 10-2011-0065092 A | 6/2011 |
| WO | WO 2013/069216 A | 5/2013 |

OTHER PUBLICATIONS

International Search Report issued Jul. 31, 2013 in counterpart Application No. PCT/KR2013/003203 (4 pages, in Korean, with English language translation).

Bross, B. et al., High efficiency video coding (HEVC) text specification draft 6, Proceedings of $8^{th}$ Meeting on Joint Collaborative Team on Video Coding (JCT-VC), held on Feb. 1-10, 2012 in San Jose (6 pages).

Lim et al., "Non-CE4 Subtest 2: Improvement on quantization matrix signaling," Proceedings of $8^{th}$ Meeting on Joint Collaborative Team on Video Coding (JCT-VC), held on Feb. 1-10, 2012 in San Jose (6 pages).

Suzuki, T., "Proposal to support quantization matrix in HEVC," Proceedings of $6^{th}$ Meeting of Joint Collaborative Team on Video Coding (JCT-VC), held on Jul. 14-22, 2011 in Torino, Italty (11 pages).

Tanaka, J. et al., "Quanization Matrix for HEVC," Proceedings of $5^{th}$ Meeting of Joint Collaborative Team on Video Coding (JCT-VC), held on Mar. 16-23, 2011 in Geneva, Switzerland (24 pages).

Extended European Search Report issued on Nov. 20, 2015 in counterpart European Application No. 13778886.5 (7 pages).

Japanese Office Action issued on Jan. 8, 2016 in counterpart Japanese Application No. 2015-505658 (5 pages in Japanese).

Budagavi, M. et al., "Delta QP signaling at sub-LCU level," Proceedings of the Joint Collaborative Team on Video Coding (JCT-VC), $4^{th}$ Meeting held Jan. 20-28, 2011, Daegu, Republic ofKorea, Document # JCTVC-D038 (5 pages).

Gergely, Korodi et al., "QuYK: A Universal, Lossless Compression Method for Quantization Matrices." Joint Collaborative Team on Video Coding (JCT-VC) of ITU-T SC16 WP3 and ISO/IEC JTC1/SC29/WG11, Geneva, Mar. 2011. (13 Pages in English).

K. Sato, et al., "Description of Core Experiment 4: Quantization." Joint Collaborative Team on Video Coding (JCT-VC) of ITU-T SG16 WP3 and ISO/IEC JTC1/SC29/WG11, Document: JCTVC-G1204, $7^{th}$ Meeting Geneva, CH, Nov. 21-30, 2011 (10 pages in English).

\* cited by examiner

METHOD AND DEVICE FOR ENCODING/DECODING IMAGE

CROSS-REFERENCE TO RELATED APPLICATIONS

This application is a National Stage of International Application No. PCT/KR2013/003203, filed Apr. 16, 2013 and published as WO 2013/157825 A1 on Oct. 24, 2013, which claims the benefit of Korean Patent Applications Nos. 10-2012-0039270, filed on Apr. 16, 2012, and 10-2013-0041807, filed on Apr. 16, 2013, the entire disclosures of which are incorporated herein by reference for all purposes.

TECHNICAL FIELD

The present invention relates to the encoding and decoding of an image and, more particularly, to the encoding/decoding of quantization matrix coefficients.

BACKGROUND ART

As broadcast having High Definition (HD) resolution is extended and served nationwide and worldwide, many users are being accustomed to images having high resolution and high picture quality. Accordingly, a lot of institutes are giving impetus to the development of the next-image device. Furthermore, as there is a growing interest in Ultra High Definition (UHD) having resolution 4 times higher than HDTV along with HDTV, there is a need for technology in which an image having higher resolution and higher picture quality is compressed and processed.

In order to compress an image, inter-prediction technology in which a value of a pixel included in a current picture is predicted from temporally anterior and/or posterior pictures, intra-prediction technology in which a value of a pixel included in a current picture is predicted using information about a pixel included in the current picture, entropy encoding technology in which a short sign is assigned to a symbol having high frequency of appearance and a long sign is assigned to a symbol having low frequency of appearance, etc. can be used.

DISCLOSURE

Technical Problem

An object of the present invention is to provide an image encoding/decoding method and apparatus capable of improving image encoding/decoding efficiency.

Another object of the present invention is to provide a method and apparatus for encoding/decoding quantization matrix coefficients which are capable of improving image encoding/decoding efficiency.

Yet another object of the present invention is to provide a method and apparatus for scanning a quantization matrix which are capable of improving image encoding/decoding efficiency.

Technical Solution

In accordance with an aspect of the present invention, there is provided an image decoding method. The image decoding method includes decoding information about a quantization matrix and reconstructing a quantization matrix based on the information about the quantization matrix, wherein the information about the quantization matrix includes at least one of information indicative of a DC value of the quantization matrix and information indicative of a difference value between quantization matrix coefficients.

If the size of a transform coefficient block where the quantization matrix is used is 16×16 or 32×32, the quantization matrix may be reconstructed using the information indicative of the DC value of the quantization matrix.

The information indicative of the DC value of the quantization matrix may be decoded into a value between −7~247.

Reconstructing a quantization matrix based on the information about the quantization matrix may includes deriving a quantization matrix coefficient using the information indicative of the difference value between the quantization matrix coefficients and arranging the quantization matrix coefficients in the quantization matrix by performing scanning on the quantization matrix coefficients.

The information indicative of the difference value between the quantization matrix coefficients may include a difference value between a current quantization matrix coefficient and a previous quantization matrix coefficient decoded prior to the current quantization matrix coefficient, and the quantization matrix coefficient may be derived by adding the previous quantization matrix coefficient to the difference value between the quantization matrix coefficients for the current quantization matrix coefficient.

The quantization matrix coefficients may be arranged in the quantization matrix by performing diagonal scan on the quantization matrix coefficients.

If the quantization matrix is used in a transform coefficient block having a 4×4 size, diagonal scan having a 4×4 size may be performed on the quantization matrix coefficients. If the quantization matrix is used in a transform coefficient block having one of 8×8, 16×16, and 32×32 sizes, diagonal scan having an 8×8 size may be performed on the quantization matrix coefficients.

In accordance with another aspect of the present invention, there is provided an image decoding apparatus. The image decoding apparatus decodes information about a quantization matrix coefficient and reconstructs a quantization matrix based on the information about the quantization matrix coefficient, wherein the information about the quantization matrix coefficient includes at least one of information indicative of a DC value of the quantization matrix and information indicative of a difference value between quantization matrix coefficients.

In accordance with yet another aspect of the present invention, there is provided an image encoding method. The image encoding method includes determining a quantization matrix used in quantization and encoding information about the quantization matrix, wherein the information about the quantization matrix includes at least one of information indicative of a DC value of the quantization matrix and information indicative of a difference value between quantization matrix coefficients.

If the size of a transform coefficient block where the quantization matrix is used is 16×16 or 32×32, the information indicative of the DC value of the quantization matrix may be encoded.

The information indicative of the DC value of the quantization matrix may be encoded into a value between −7~247.

Encoding information about the quantization matrix may include deriving an array of arranged quantization matrix coefficients by performing scan on the quantization matrix coefficients and generating information indicative of a difference value between the arranged quantization matrix coefficients and encoding the array of the arranged quantization matrix coefficients using the generated information.

The array of the arranged quantization matrix coefficients may be derived by performing diagonal scan on the quantization matrix.

The information indicative of the difference value between the arranged quantization matrix coefficients may include a difference value between a current quantization matrix coefficient and a previous quantization matrix coefficient previously encoded prior to the current quantization matrix coefficient within the array of the arranged quantization matrix coefficients.

If the quantization matrix is used in a transform coefficient block having a 4×4 size, diagonal scan having a 4×4 size may be performed on the quantization matrix. If the quantization matrix is used in a transform coefficient block having one of 8×8, 16×16, and 32×32 sizes, diagonal scan having an 8×8 size may be performed on the quantization matrix.

In accordance with further yet another aspect of the present invention, there is provided an image encoding apparatus. The image encoding apparatus determines a quantization matrix used in quantization and encodes information about the quantization matrix, wherein the information about the quantization matrix includes at least one of information indicative of a DC value of the quantization matrix and information indicative of a difference value between quantization matrix coefficients.

Advantageous Effects

The present invention can reduce logic necessary to implement zigzag scan and a memory space for storing zigzag scan arrays in an encoder and a decoder by providing a method of scanning quantization matrix coefficients.

MODE FOR INVENTION

Figure 1:
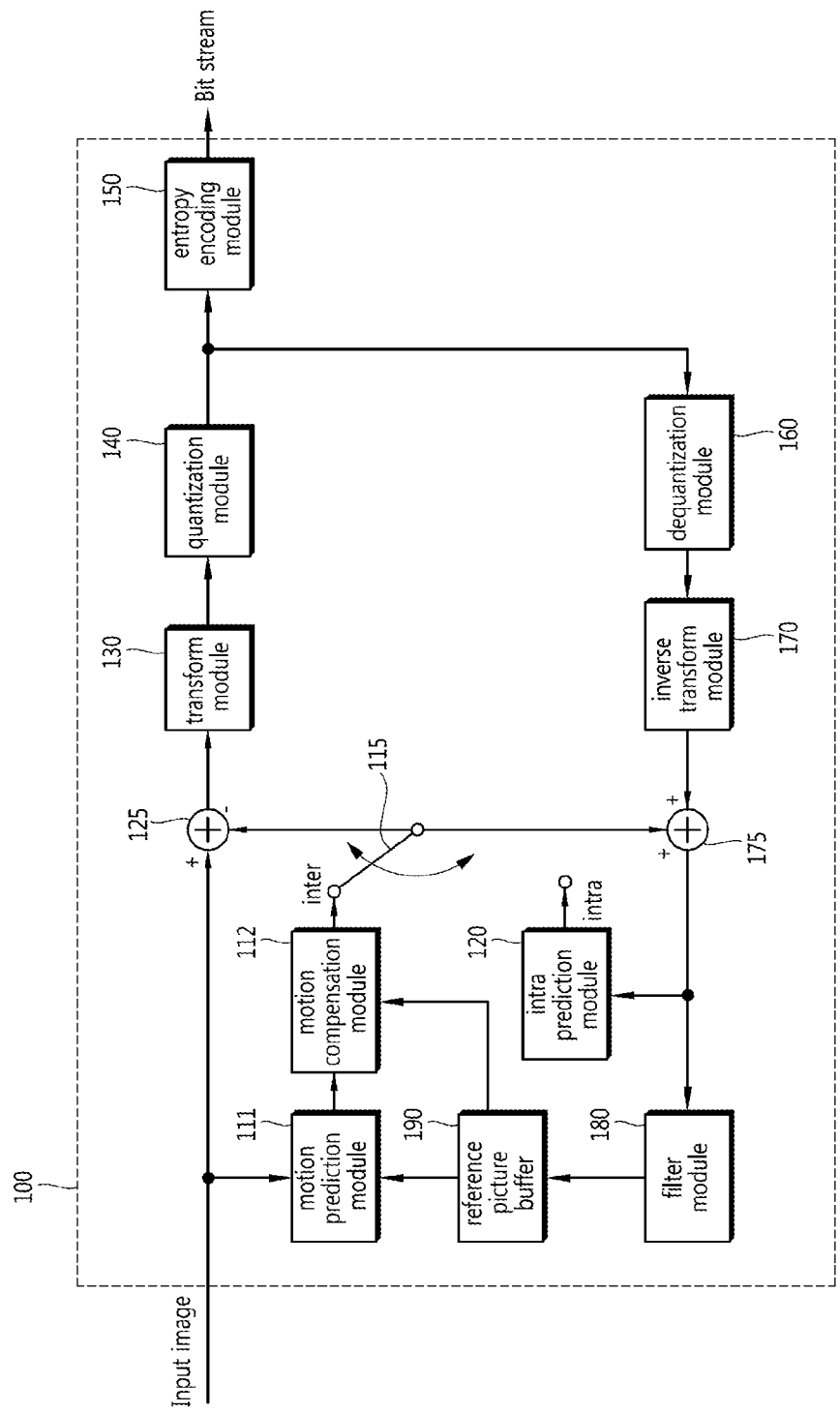
FIG. 1 is a block diagram showing a construction according to an embodiment of an image encoding apparatus to which the present invention is applied.

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

In this specification, when it is said that one element is 'connected' or 'coupled' with the other element, it may mean that the one element may be directly connected or coupled with the other element and a third element may be 'connected' or 'coupled' between the two elements. Furthermore, in this specification, when it is said that a specific element is 'included', it may mean that elements other than the specific element are not excluded and that additional elements may be included in the embodiments of the present invention or the scope of the technical spirit of the present invention.

Terms, such as the first and the second, may be used to describe various elements, but the elements are not restricted by the terms. The terms are used to only distinguish one element from the other element. For example, a first element may be named a second element without departing from the scope of the present invention. Likewise, a second element may be named a first element.

Furthermore, element units described in the embodiments of the present invention are independently shown in order to indicate different and characteristic functions, and it does not mean that each of the element units is formed of a piece of separated hardware or a piece of software. That is, the element units are arranged and included, for convenience of description, and at least two of the element units may form one element unit or one element may be divided into a plurality of element units and the plurality of element units may perform functions. An embodiment into which elements are integrated or an embodiment from which some elements are separated is included in the scope of the present invention unless it departs from the essence of the present invention.

Furthermore, some elements are not essential elements for performing essential functions, but may be optional elements for improving only performance. The present invention may be implemented using only essential elements for implementing the essence of the present invention other than elements used to improve only performance, and a structure including only essential elements other than optional elements used to improve only performance is included in the scope of the present invention.

First, in order to help convenience of description and understanding of the present invention, terms used in this specification are described in brief.

A unit means an image encoding or decoding unit. In other words, when an image is encoded or decoded, an encoding or decoding unit refers to a divided unit of one image when the image is sub-divided and encoded or decoded. The unit may also be called a block, a Macro Block (MB), a Coding Unit (CU), a Prediction Unit (PU), a Transform Unit (TU), a Coding Block (CB), a Prediction Block (PB), or a Transform Block (TB). One unit can be divided into smaller sub-units.

A block refers to an M×N array of samples. M and N have a positive integer value. A block may commonly mean an array of a 2-D form.

A Transform Unit (TU) is a basic unit when a residual signal is encoded/decoded, such as transform, inverse transform, quantization, dequantization, transform coefficient encoding/decoding. One transform unit can be divided into a plurality of smaller transform units.

A quantization matrix means a matrix used in a quantization or dequantization process in order to improve the subjective or objective picture quality of an image. The quantization matrix is also called a scaling list.

A default matrix may mean a specific quantization matrix that is defined in an encoder/decoder. The non-default matrix may mean a quantization matrix that is not defined in an encoder/decoder, but is transmitted or received by a user.

A quantization matrix coefficient refers to each element within a quantization matrix, and the quantization matrix coefficient is also called a matrix coefficient.

Scan refers to a method of arranging order of coefficients within a block or matrix. For example, to arrange a 2-D array in a 1-D array form is called scan, and to arrange a 1-D array in a 2-D array form may also be called scan.

Scaling refers to a process of multiplying a transform coefficient level by a factor. As a result, a transform coefficient is generated. Scaling is also called dequantization.

A transform coefficient refers to a coefficient value generated after transform is performed. In this specification, a quantized transform coefficient level obtained by applying quantization to a transform coefficient is also called a transform coefficient.

Zigzag scan is a specific scan method for sequentially arranging coefficients, corresponding to the highest spatial frequency, from a coefficient (e.g., a quantization matrix coefficient or a transform coefficient level) corresponding to the lowest spatial frequency.

A quantization parameter refers to a value used to scale a transform coefficient level in quantization and dequantization. Here, the quantization parameter may be a value mapped to a quantization step size.

A parameter set corresponds to information about a header in a structure within a bit stream. The parameter set has a meaning that commonly designates a sequence parameter set, a picture parameter set, and an adaptation parameter set.

FIG. 1 is a block diagram showing a construction according to an embodiment of an image encoding apparatus to which the present invention is applied.

Referring to FIG. 1, the image encoding apparatus 100 includes a motion prediction module 111, a motion compensation module 112, an intra-prediction module 120, a switch 115, a subtractor 125, a transform module 130, a quantization module 140, an entropy encoding module 150, an dequantization module 160, an inverse transform module 170, an adder 175, a filter module 180, and a reference picture buffer 190.

The image encoding apparatus 100 can perform encoding on an input image in intra-mode or inter-mode and output a bit stream. In the case of intra-mode, the switch 115 can switch to intra mode. In the case of inter-mode, the switch 115 can switch to inter-mode. Intra-prediction means intra-frame prediction, and inter-prediction means inter-frame prediction. The image encoding apparatus 100 can generate a prediction block for the input block of the input image and then encode a difference between the input block and the prediction block. Here, the input image can mean the original picture.

In the case of intra-mode, the intra-prediction module 120 can generate the prediction block by performing spatial prediction using a value of the pixel of an already encoded block neighboring a current block.

In the case of inter-mode, the motion prediction module 111 can obtain a motion vector by searching a reference picture, stored in the reference picture buffer 190, for a region that is most well matched with the input block in a motion prediction process. The motion compensation module 112 can generate the prediction block by performing motion compensation using the motion vector and the reference picture stored in the reference picture buffer 190. Here, the motion vector is a two-dimensional (2-D) vector used in inter-prediction, and the motion vector can indicate an offset between a picture to be encoded/decoded and a reference picture.

The subtractor 125 can generate a residual block based on the difference between the input block and the generated prediction block.

The transform module 130 can perform transform on the residual block and output a transform coefficient according to the transformed block. Furthermore, the quantization module 140 can output a quantized coefficient by quantizing the received transform coefficient according to a quantization parameter.

The entropy encoding module 150 can perform entropy encoding on a symbol according to a probability distribution based on values calculated by the quantization module 140, an encoding parameter value calculated in an encoding process, etc. and output a bit stream according to the entropy-coded symbols. If entropy encoding is applied, the size of a bit stream for a symbol to be encoded can be reduced because the symbol is represented by allocating a small number of bits to a symbol having a high incidence and a large number of bits to a symbol having a low incidence. Accordingly, the compression performance of image encoding can be improved through entropy encoding. The entropy encoding module 150 can use such encoding methods as exponential Golomb, Context-Adaptive Binary Arithmetic Coding (CABAC), and Context-Adaptive Binary Arithmetic Coding (CABAC) for the entropy encoding.

The image encoding apparatus 100 according to the embodiment of FIG. 1 performs inter-predictive encoding, that is, inter-frame predictive encoding, and thus a picture that has been coded needs to be decoded and stored in order to be used as a reference picture. Accordingly, a quantized coefficient is dequantized by the dequantization module 160 and inverse transformed by the inverse transform module 170. The dequantized and inversely transformed coefficient is added to the prediction block through the adder 175, thereby generating a reconstructed block.

The reconstructed block experiences the filter module 180. The filter module 180 can apply one or more of a deblocking filter, a Sample Adaptive Offset (SAO), and an Adaptive Loop Filter (ALF) to the reconstructed block or the reconstructed picture. The filter module 180 may also be called an adaptive in-loop filter. The deblocking filter can remove block distortion generated at the boundary of blocks. The SAO can add a proper offset value to a pixel value in order to compensate for a coding error. The ALF can perform filtering based on a value obtained by comparing a reconstructed picture with the original picture. The reconstructed block that has experienced the filter module 180 can be stored in the reference picture buffer 190.

Figure 2:
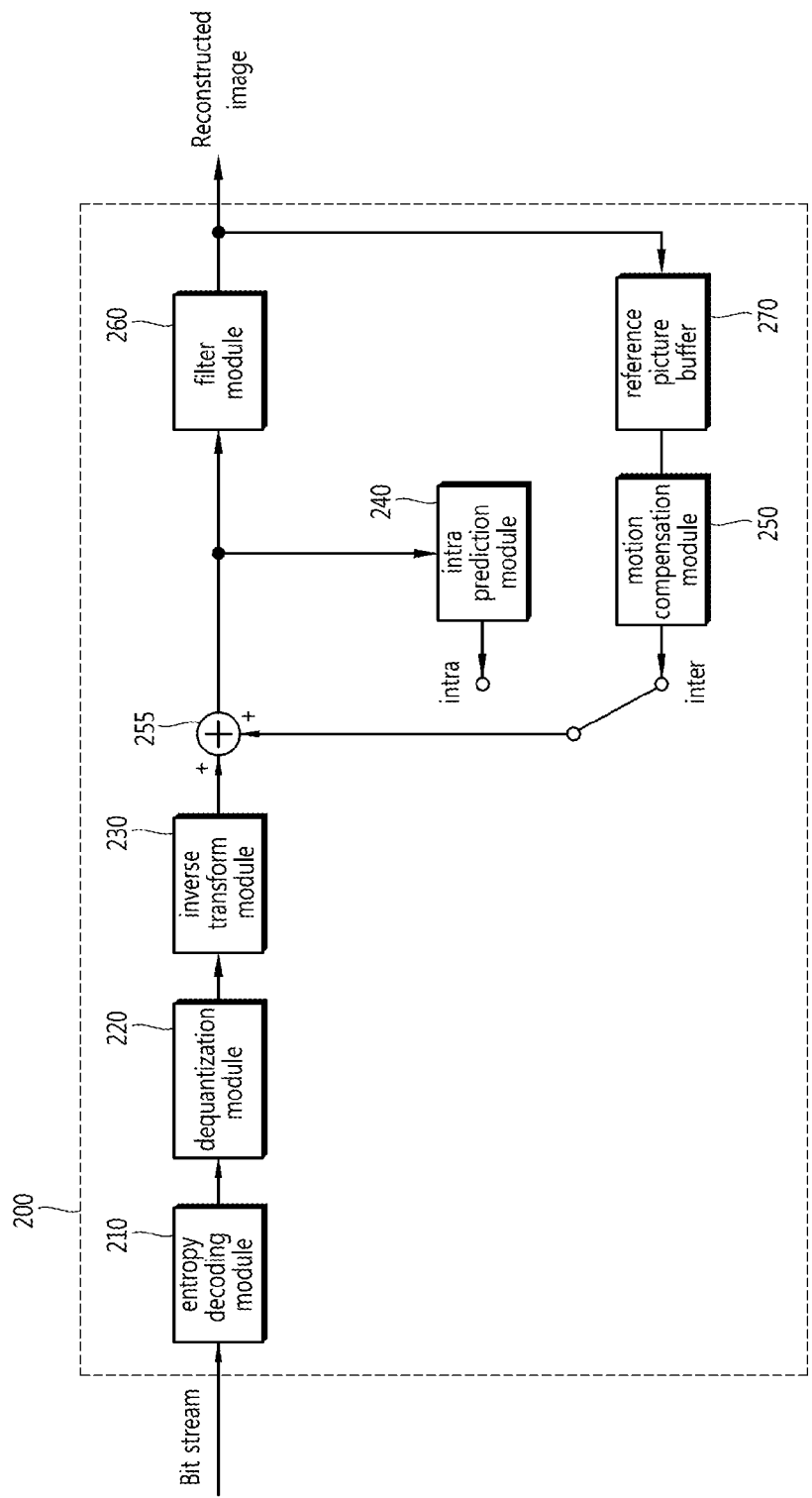
FIG. 2 is a block diagram showing a construction according to an embodiment of an image decoding apparatus to which the present invention is applied.

FIG. 2 is a block diagram showing a construction according to an embodiment of an image decoding apparatus to which the present invention is applied.

Referring to FIG. 2, the image decoding apparatus 200 includes an entropy decoding module 210, a dequantization module 220, an inverse transform module 230, an intra-prediction module 240, a motion compensation module 250, a filter module 260, and a reference picture buffer 270.

The image decoding apparatus 200 can receive a bit stream outputted from an encoder, perform decoding on the bit stream in intra-mode or inter-mode, and output a reconstructed image, that is, a reconstructed image. In the case of intra-mode, a switch can switch to intra-mode. In the case of inter-mode, the switch can switch to inter-mode.

The image decoding apparatus 200 can obtain a reconstructed residual block from the received bit stream, generate a prediction block, and generate a reconstructed block, that is, a restoration block, by adding the reconstructed residual block to the prediction block.

The entropy decoding module 210 can generate symbols including a symbol having a quantized coefficient form by performing entropy decoding on the received bit stream according to a probability distribution.

If an entropy decoding method is applied, the size of a bit stream for each symbol can be reduced because the symbol is represented by allocating a small number of bits to a symbol having a high incidence and a large number of bits to a symbol having a low incidence.

The quantized coefficient is dequantized by the dequantization module 220 and is inversely transformed by the inverse transform module 230. As a result of the dequantization/inverse transform of the quantized coefficient, a reconstructed residual block can be generated.

In the case of intra-mode, the intra-prediction module 240 can generate the prediction block by performing spatial prediction using a value of the pixel of an already decoded block neighboring a current block. In the case of inter-mode, the motion compensation module 250 can generate the prediction block by performing motion compensation using a motion vector and a reference picture stored in the reference picture buffer 270.

The residual block and the prediction block are added together by an adder 255. The added block experiences the filter module 260. The filter module 260 can apply at least one of a deblocking filter, an SAO, and an ALF to the reconstructed block or the reconstructed picture. The filter module 260 outputs a reconstructed image, that is, a reconstructed image. The reconstructed image can be stored in the reference picture buffer 270 and can be used for inter-frame prediction.

Figure 3:
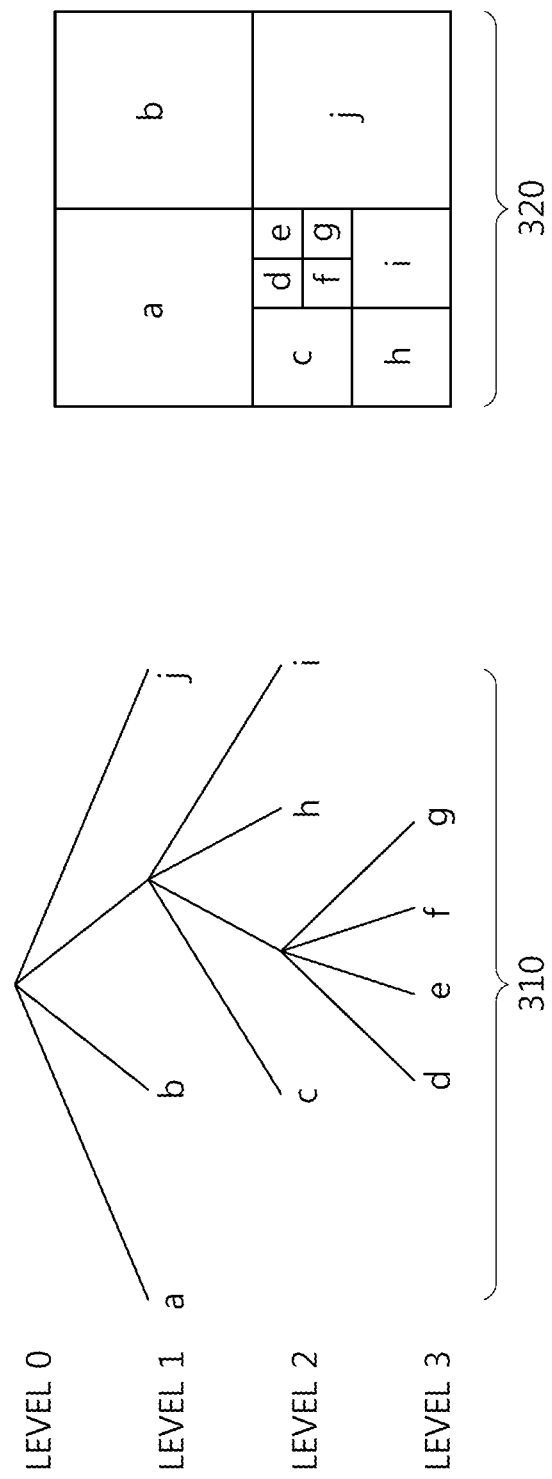
FIG. 3 is a conceptual diagram schematically showing an embodiment in which one unit is partitioned into a plurality of sub-units.

FIG. 3 is a conceptual diagram schematically showing an embodiment in which one unit is partitioned into a plurality of sub-units.

Block partition information can include information about the depth of a unit. The depth information can indicate the number and/or degree of partitions of the unit.

One unit can be hierarchically partitioned with depth information based on a tree structure. Each of the partitioned sub-units can have depth information. The depth information can include information about the size of a sub-unit because the unit indicates the number and/or degree of partitions of the unit.

Referring to 310 of FIG. 3, the highest node may be called a root node, and it can have the smallest depth value. Here, the highest node can have the depth of a level 0 and represent the first unit that has not been partitioned.

A lower node having the depth of a level 1 can indicate a unit partitioned from the first unit once. A lower node having the depth of a level 2 can indicate a unit partitioned from the first unit twice. For example, in 320 of FIG. 3, a unit a corresponding to a node 'a' is a unit partitioned from the first unit once, and it can have the depth of the level 1.

A leaf node having a level 3 can indicate a unit partitioned from the first unit three times. For example, in 320 of FIG. 3, a unit 'd.' corresponding to a node 'd' is a unit partitioned from the first unit three times, and it can have the depth of the level 3. Accordingly, the leaf node having the level 3, that is, the lowest node, can have the deepest depth.

Meanwhile, in order to improve the subjective and objective picture quality of an image, an encoder uses a quantization matrix when quantizing a transform coefficient using a different value for each spatial frequency in a quantization process, and a decoder uses a quantization matrix when dequantizing a transform coefficient using a different value for each spatial frequency in a dequantization process.

In the quantization and dequantization processes, each of the encoder and the decoder may use a predetermined default matrix as the quantization matrix, or the encoder may use a quantization matrix defined by a user. The quantization matrix defined by a user may be called a non-default matrix. Here, the encoder can encode the quantization matrix (i.e., non-default matrix) into a bit stream and send the bit stream to the decoder.

A method and apparatus for scanning quantization matrix coefficients according to the present invention are described below.

Figure 4:
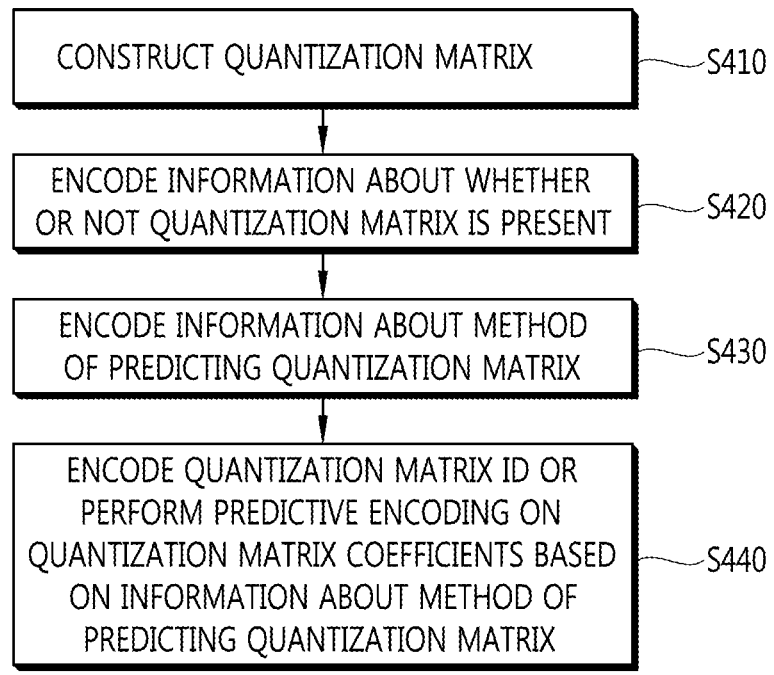
FIG. 4 is a flowchart schematically illustrating a method of encoding a quantization matrix in accordance with an embodiment of the present invention.

FIG. 4 is a flowchart schematically illustrating a method of encoding a quantization matrix in accordance with an embodiment of the present invention. The method of FIG. 4 can be performed by the image encoding apparatus of FIG. 1.

Referring to FIG. 4, the image encoding apparatus can construct a quantization matrix at step S410. That is, the image encoding apparatus can construct a quantization matrix to be used in a transform coefficient block (or a transform block) in a quantization/dequantization process.

For example, a quantization matrix necessary for a quantization/dequantization process can be constructed using a default matrix that is defined in an encoder and a decoder.

For another example, a quantization matrix necessary for a quantization/dequantization process can be constructed using a non-default matrix that has been inputted to an encoder by a user.

Here, the image encoding apparatus can construct a quantization matrix so that a different quantization matrix is used depending on prediction mode (e.g., intra-frame prediction mode or inter-frame prediction mode) of a transform coefficient block, a color component (e.g., a luma component or a chroma component), and a block size (e.g., 4×4, 8×8, 16×16, 32×32, 16×4, 4×16, 32×8, or 8×32). The constructed quantization matrix can include various quantization matrices.

A quantization matrix to be used in a transform coefficient block having a 16×16 or 32×32 size is used as a quantization matrix having a 16×16 or 32×32 size when quantization/dequantization is performed, but can be represented by a quantization matrix having an 8×8 size and encoded.

For example, when an encoder receives a quantization matrix having a 16×16 or 32×32 size, the encoder can use the quantization matrix having a 16×16 or 32×32 size when performing quantization/dequantization, form the received quantization matrix having a 16×16 or 32×32 size into a quantization matrix having an 8×8 size through sub-sampling or down-sampling, and encode the quantization matrix having an 8×8 size. For another example, when an encoder receives a quantization matrix having an 8×8 size, the encoder can form the received quantization matrix having an 8×8 size into a quantization matrix having a 16×16 or 32×32 size through up-sampling or interpolation when performing quantization/dequantization and can encode the received quantization matrix having an 8×8 size.

Table 1 shows an example of a quantization matrix that can be used depending on prediction mode, a color component, and a block size of the above-described transform coefficient block.

TABLE 1

| | Luminance Block | Chrominance Block |
|---|---|---|
| | Intra Prediction Mode | |
| 4 × 4 | {6, 9, 12, 22, 8, 12, 24, 31, | {11, 12, 14, 19, 12, 14, 20, 23, |

TABLE 1-continued

| | Luminance Block | Chrominance Block |
|---|---|---|
| | 12, 16, 30, 35, 13, 17, 32, 38} | 14, 16, 23, 25, 14, 16, 24, 27} |
| 8 × 8/ 16 × 16/ 32 × 32 | {11, 11, 12, 14, 17, 18, 19, 19, 11, 11, 12, 16, 19, 20, 21, 21, 11, 12, 13, 18, 24, 26, 27, 27, 11, 12, 14, 19, 29, 32, 33, 33, 12, 13, 16, 22, 32, 36, 38, 38, 12, 15, 18, 27, 36, 39, 40, 41, 13, 16, 19, 29, 35, 40, 41, 42, 13, 16, 21, 30, 37, 40, 42, 42} | {2, 2, 2, 8, 20, 24, 28, 28, 2, 2, 2, 16, 28, 34, 36, 38, 2, 2, 6, 24, 48, 56, 60, 60, 2, 2, 8, 28, 70, 80, 84, 86, 2, 6, 18, 40, 82, 98, 104, 104, 2, 12, 24, 60, 96, 108, 114, 116, 6, 16, 28, 68, 94, 112, 118, 120, 6, 16, 36, 72, 102, 114, 120, 122} |
| | Inter Prediction Mode | |
| 4 × 4 | {10, 15, 26, 39, 13, 18, 39, 49, 16, 29, 50, 58, 23, 42, 56, 62} | {14, 15, 18, 20, 15, 16, 20, 22, 16, 18, 22, 24, 17, 21, 24, 25} |
| 8 × 8/ 16 × 16/ 32 × 32 | {14, 14, 15, 17, 19, 20, 20, 21, 14, 15, 16, 18, 19, 21, 21, 22, 15, 15, 17, 18, 20, 22, 23, 24, 15, 16, 18, 20, 22, 23, 24, 25 16, 17, 20, 21, 24, 25, 26, 27, 16, 17, 20, 22, 25, 26, 27, 27, 17, 18, 21, 23, 25, 27, 28, 28, 17, 18, 21, 24, 26, 27, 28, 28} | {5, 5, 14, 32, 44, 52, 59, 62, 5, 10, 17, 34, 50, 61, 68, 70, 8, 12, 25, 37, 57, 70, 84, 91, 10, 17, 34, 52, 73, 84, 95, 104, 17, 26, 52, 66, 88, 98, 113, 116, 23, 32, 57, 73, 97, 107, 118, 122, 26, 35, 62, 84, 102, 118, 124, 125, 30, 35, 64, 89, 107, 120, 124, 125} |

The image encoding apparatus can encode information about whether or not a quantization matrix is present at step S420. For example, the image encoding apparatus can encode information indicative of whether or not a quantization matrix is present into a parameter set. Here, the parameter set may be an adaptation parameter set.

Table 2 shows an example of the syntax element of a parameter set that is used to encoded information about whether or not a quantization matrix is present.

TABLE 2

| scaling_list_param( ) { | Descriptor |
|---|---|
|   scaling_list_present_flag | u(1) |
|   if( scaling_list_present_flag ) | |
|     for( sizeID = 0; sizeID < 4; sizeID++ ) | |
|       for( matrixID = 0; matrixID < (sizeID = = 3) ? 2 : 6; matrixID++ ) | |
| { | |
|         scaling_list_pred_mode_flag | u(1) |
|         if( !scaling list pred mode flag ) | |
|           scaling_list_pred_matrix_id_delta | ue(v) |
|         else | |
|         scaling_list( ScalingList[ sizeID ][ matrixID ], sizeID , matrixID ) | |
|     } | |
| } | |

Referring to Table 2, information indicative of whether or not a quantization matrix is present within a bit stream can be encoded into a parameter set using a flag. For example, a flag indicating whether or not a quantization matrix is present may be indicated by scaling_list_present_flag. If a quantization matrix is not present, for example, if all quantization matrices are determined as default matrices, a value of scaling_list_present_flag can be set to 0 and encoded. If an encoded quantization matrix is present, a value of scaling_list_present_flag can be set to 1 and encoded.

In Table 2, a value of sizeID can mean the size of a transform coefficient block or the size of a quantization matrix, and a value of matrixID can mean the type of a quantization matrix according to prediction mode and a color component.

For example, Table 3 shows a value of sizeID according to the size of a quantization matrix, and Table 4 shows a value of matrixID according to prediction mode and a color component.

TABLE 3

| QUANTIZATION MATRIX SIZE | sizeID |
|---|---|
| 4 × 4 | 0 |
| 8 × 8 (16 × 4, 4 × 16) | 1 |
| 16 × 16 (32 × 8, 8 × 32) | 2 |
| 32 × 32 | 3 |

TABLE 4

| sizeID | Prediction mode | Color component | matrixID |
|---|---|---|---|
| 0, 1, 2 | Intra-frame prediciton mode | Luma (Y) | 0 |
| 0, 1, 2 | Intra-frame prediciton mode | Chroma (Cb) | 1 |
| 0, 1, 2 | Intra-frame prediciton mode | Chroma (Cb) | 2 |
| 0, 1, 2 | Inter-frame prediciton mode | Luma (Y) | 3 |
| 0, 1, 2 | Inter-frame prediciton mode | Chroma (Cb) | 4 |
| 0, 1, 2 | Inter-frame prediciton mode | Chroma (Cb) | 5 |
| 3 | Intra-frame prediciton mode | Luma (Y) | 0 |
| 3 | Inter-frame prediciton mode | Luma (Y) | 1 |

In Table 2, scaling_list_present_flag is used as a flag indicating information about whether or not a quantization matrix is present, but this is only an example. The name of the flag can be changed. For example, sps_scaling_list_data_present_flag may be used to indicate information about whether or not a quantization matrix is present in sequence parameter set.

The image encoding apparatus can encode information about a method of predicting a quantization matrix at step S430. For example, the image encoding apparatus can determine the type of a method of predicting a quantization matrix and encode information about the determined method of predicting a quantization matrix into a parameter set. Here, the parameter set may be an adaptation parameter set.

Referring to Table 2, information about a method of predicting a quantization matrix can be encoded into a parameter set using a flag. For example, a flag indicating a method of predicting a quantization matrix may be indicated by scaling_list_pred_mode_flag. Here, in order to perform predictive encoding on coefficients within a quantization matrix, if it is determined that the quantization matrix is scanned and Differential Pulse Code Modulation (DPCM) and an exponential-Golomb code are used, a value of scaling_list_pred_mode_flag can be set to 1 and encoded. For another example, if it is determined that a reference quantization matrix and a quantization matrix to be encoded have the same coefficient value in order to perform prediction between quantization matrices, a value of scaling_list_pred_mode_flag can be set to 0 and encoded. Here, the meaning that the reference quantization matrix and the quantization matrix to be encoded have the same value may correspond to a quantization matrix prediction method of copying a coefficient value of the reference quantization matrix to a coefficient value of the quantization matrix to be encoded.

In Table 2, scaling_list_pred_mode_flag is used as a flag indicating information about a method of predicting a quantization matrix, but this is only an example. The name of the flag can be changed.

The image encoding apparatus can encode a quantization matrix ID (identifier) in order to perform prediction between quantization matrices or perform predictive encoding on coefficients within the quantization matrix based on the information about the method of predicting a quantization matrix at step S440.

For example, if it is determined that the quantization matrix to be encoded has the same coefficient value as the reference quantization matrix in order to perform prediction between quantization matrices according to the method of predicting a quantization matrix (e.g., scaling_list_pred_mode_flag=0), the reference quantization matrix ID of the quantization matrix to be encoded can be encoded into a parameter set. Here, the parameter set may be an adaptation parameter set.

Referring to Table 2, scaling_list_pred_matrix_id_delta indicating the reference quantization matrix ID of a quantization matrix to be encoded can be encoded into a parameter set. Here, a quantization matrix ID 'scaling_list_pred_matrix_id_delta' can be determined using matrixID indicative of the quantization matrix to be encoded and RefMatrixID indicative of the reference quantization matrix. For example, the quantization matrix ID' 'scaling_list_pred_matrix_id_delta' can be determined as in Equation 1.

scaling_list_pred_matrix_id_delta=matrixID−(RefMatrixID+1)  [Equation 1]

The method of determining the quantization matrix to be encoded so that it has the same coefficient value as the reference quantization matrix can be a quantization matrix prediction method of determining the reference quantization matrix indicated by RefMatrixID as the reference quantization matrix of the quantization matrix to be encoded and copying the coefficient value of the reference quantization matrix to the coefficient value to the quantization matrix to be encoded.

For another example, if it is determined that the quantization matrix to be encoded has the same coefficient value as the reference quantization matrix or a default matrix in order to perform prediction between quantization matrices according to the method of predicting a quantization matrix (e.g., scaling_list_pred_mode_flag=0), information about the reference quantization matrix ID of the quantization matrix to be encoded and whether or not the default matrix is used can be encoded into a parameter set. Here, the parameter set may be an adaptation parameter set.

Referring to Table 2, if it is determined that the quantization matrix to be encoded has the same coefficient value as the reference quantization matrix or if it is determined that the quantization matrix to be encoded has the same coefficient value as the default matrix, scaling_list_pred_matrix_id_delta indicating the reference quantization matrix ID of the quantization matrix to be encoded can be encoded into a parameter set. Here, the quantization matrix ID 'scaling_list_pred_matrix_id_delta' can be determined using matrixID indicative of the quantization matrix to be encoded and RefMatrixID indicative of the reference quantization matrix and the default matrix. For example, the quantization matrix ID 'scaling_list_pred_matrix_id_delta' can be determined as in Equation 2.

scaling_list_pred_matrix_id_delta=matrixID−RefMatrixID  [Equation 2]

If it is determined that the quantization matrix to be encoded has the same coefficient value as the default matrix that is defined in an encoder and a decoder, a value of RefMatrixID can be made identical with that of matrixID and a value of scaling_list_pred_matrix_id_delta can be encoded as 0. Here, the default matrix means a default matrix indicated by sizeID and matrixID.

If it is determined that the quantization matrix to be encoded has the same coefficient value as the reference quantization matrix, a value of scaling_list_pred_matrix_id_delta value is encoded as a value not 0 so that a value of RefMatrixID is not identical with that of matrixID.

For yet another example, if it is determined that a quantization matrix is scanned and DPCM and an exponential-Golomb code are used (e.g., scaling_list_pred_mode_flag=1) in order to perform predictive encoding on coefficients within the quantization matrix according to the method of predicting a quantization matrix, a difference value between a previous quantization matrix coefficient and a current quantization matrix coefficient within the quantization matrix can be encoded into a parameter set. Here, the parameter set may be an adaptation parameter set.

Table 5 shows an example of the syntax element of a parameter set used to perform predictive encoding coefficients within a quantization matrix.

TABLE 5

| scaling_list( scalingList, sizeID , matrixID ) { | Descriptor |
|---|---|
| nextCoef = 8 | u(1) |
| coefNum = Min( 64, ( 1 << ( 4 + ( sizeID << 1) ) ) ) | |
| UseDefaultScalingMatrix = 0 | |
| if( sizeID > 1 ) { | |
|   scaling_list_dc_coef_minus8[ sizeID − 2 ][ matrixID ] | se(v) |
|   if( scaling_list_dc_coef_minus8[ sizeID − 2 ][ matrixID ] | |
|   = = −8 ) | |
|     UseDefaultScalingMatrixFlag = 1 | |
| } | |
| if( UseDefaultScalingMatrixFlag = = 0 ) { | |
|   stopNow = 0 | |
|   for( i=0; i < coefNum && !stopNow; i++) { | |
|     scaling_list_delta_coef | se(v) |
|     nextCoef = ( nextCoef + scaling_list_delta_coef + 256) % 256 | |
|     if( sizeID < 2 ) { | |
|       useDefaultScalingMatrixFlag = (i = = 0 && nextCoef = = 0 ) | |
|       if( useDefaultScalingMatrixFlag ) | |
|         stopNow = 1 | |
|     } | |
|     if( !stopNow ) | |
|       scalingList[ i ] = nextCoef | |
|   } | |
| } | |
| } | |

Referring to Table 5, the size of a quantization matrix to be encoded is 16×16 (sizeID=2) or 32×32 (sizeID=3), scaling_list_dc_coef_minus8 indicative of a DC matrix coefficient value can be encoded into a parameter set. A value of scaling_list_dc_coef_minus8 may be limited to a value between −7~247 that can be represented by 8 bits and encoded into a value between −7~247 using a signed exponential-Golomb code.

Or, scaling_list_delta_coef indicative of a difference value between a previous quantization matrix coefficient and a current quantization matrix coefficient within a quantization matrix can be encoded into a parameter set. For example, if a default matrix is used, only one value of scaling_list_delta_coef can be encoded. For another example, if a quantization matrix having a 4×4 size is to be encoded, a total of 16 values, that is, the number of coefficients within the quantization matrix having a 4×4 size, can be encoded using scaling_list_delta_coef. For yet another example, if a quantization matrix used in a transform coefficient block having an 8×8 size or higher is to be encoded, a total of 64 values, that is, the number of coefficients within the quantization matrix having an 8×8 size, can be encoded using scaling_list_delta_coef. A method of predictive encoding coefficients within a quantization matrix using a difference value 'scaling_list_delta_coef' between the coefficients within the quantization matrix is described in detail later with reference to FIGS. 5 to 13.

Meanwhile, information about whether or not a default matrix is used can be encoded using scaling_list_delta_coef that is used to calculate scaling_list_dc_coef_minus8 or nextCoef. For example, a value of scaling_list_dc_coef_minus8 may be encoded into −8 in order to inform a decoder that that a default matrix is used. For another example, a value of scaling_list_delta_coef may be encoded so that the first nextCoef value becomes 0 in order to inform a decoder that that a default matrix is used.

Figure 5:
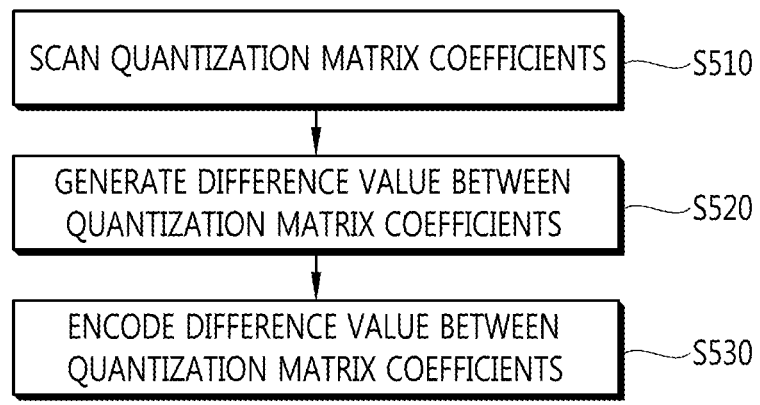
FIG. 5 is a flowchart schematically illustrating a method of predictive encoding quantization matrix coefficients in accordance with an embodiment of the present invention.

FIG. 5 is a flowchart schematically illustrating a method of predictive encoding quantization matrix coefficients in accordance with an embodiment of the present invention. The method of FIG. 5 can be performed by the image encoding apparatus of FIG. 1. Furthermore, the method of FIG. 5 can correspond to the process of predictive encoding quantization matrix coefficients based on the difference value 'scaling_list_delta_coef' between coefficients within a quantization matrix at step S440 of FIG. 4.

Referring to FIG. 5, the image encoding apparatus scans quantization matrix coefficients at step S510. That is, the image encoding apparatus performs scan for arranging coefficients within a 2-D quantization matrix in a coefficient array having a 1-D form.

FIGS. 6 to 13 show embodiments of a method of scanning coefficients within a quantization matrix.

Figure 6:
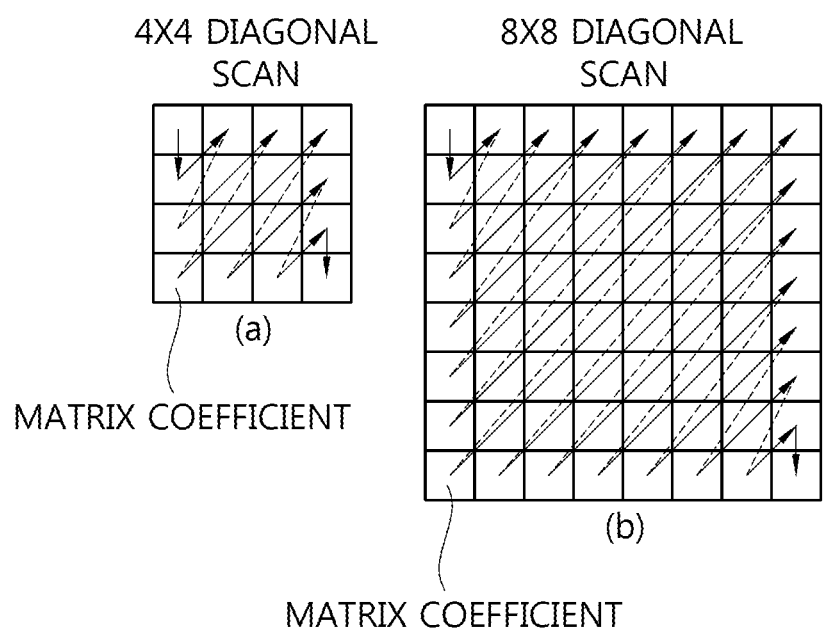
FIG. 6 is a diagram showing an example of diagonal scan which can be applied to a quantization matrix having a 4×4 or 8×8 size in accordance with an embodiment of the present invention.

FIG. 6 is a diagram showing an example of diagonal scan which can be applied to a quantization matrix having a 4×4 or 8×8 size in accordance with an embodiment of the present invention.

As shown in FIG. 6, coefficients within a 2-D quantization matrix having a 4×4 or 8×8 size can be arranged in a coefficient array having a 1-D form using diagonal scan. Here, the direction of the diagonal scan can be from a down-left direction to an up-right direction as in FIG. 6. Or, the direction of the diagonal scan may be from an up-right direction to a down-left direction. If a scan direction is from a down-left direction to an up-right direction, it can be called up-right scan. Or, if a scan direction is from an up-right direction to a down-left direction, it can be called down-left scan. The diagonal scan shown in FIG. 6 shows an example of up-right scan.

Figure 7:
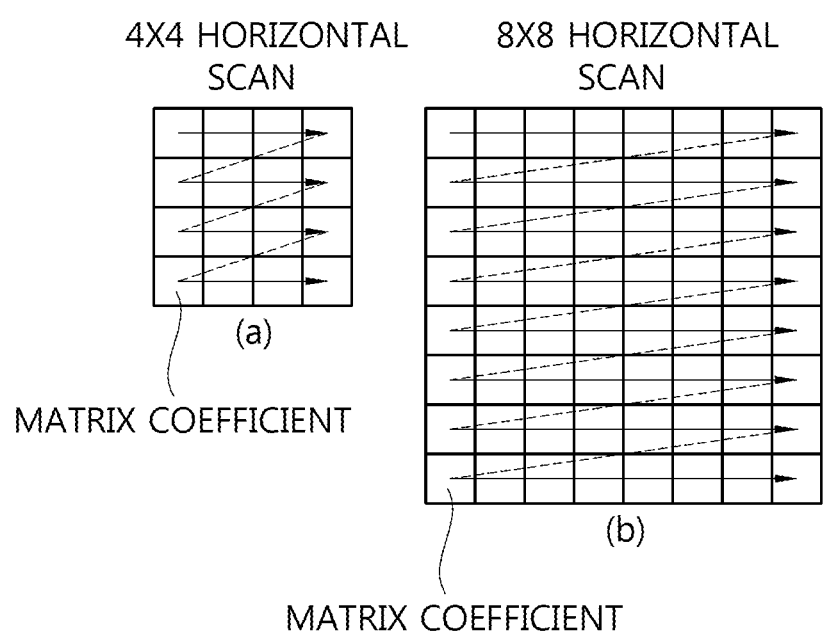
FIG. 7 is a diagram showing an example of horizontal scan which can be applied to a quantization matrix having a 4×4 or 8×8 size in accordance with an embodiment of the present invention.

FIG. 7 is a diagram showing an example of horizontal scan which can be applied to a quantization matrix having a 4×4 or 8×8 size in accordance with an embodiment of the present invention.

As shown in FIG. 7, coefficients within a 2-D quantization matrix having a 4×4 or 8×8 size can be arranged in a coefficient array having a 1-D form using horizontal scan. The horizontal scan is sequentially performed on each of rows within the 2-D quantization matrix from the first row to the last row, and coefficients within each row can be scanned from the left to the right.

Figure 8:
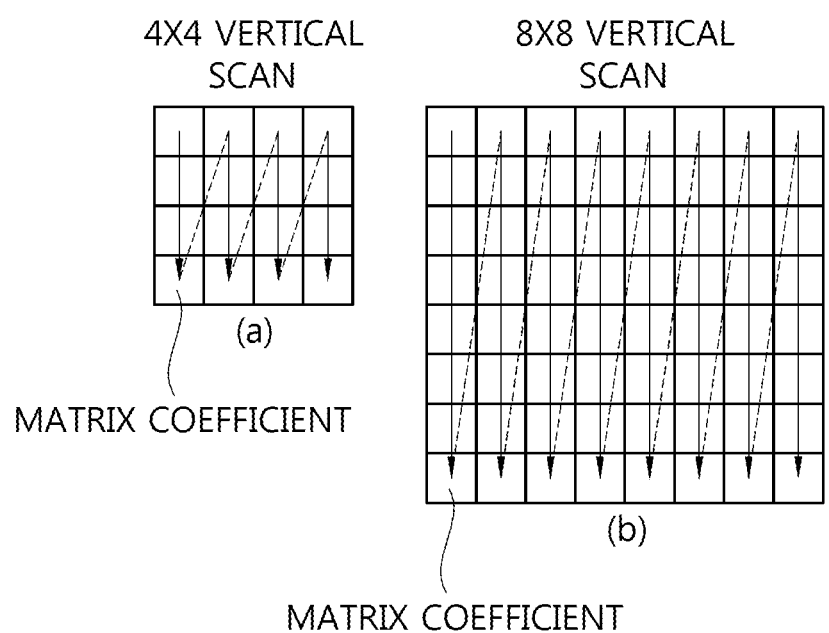
FIG. 8 is a diagram showing an example of vertical scan which can be applied to a quantization matrix having a 4×4 or 8×8 size in accordance with an embodiment of the present invention.

FIG. 8 is a diagram showing an example of vertical scan which can be applied to a quantization matrix having a 4×4 or 8×8 size in accordance with an embodiment of the present invention.

As shown in FIG. 8, coefficients within a 2-D quantization matrix having a 4×4 or 8×8 size can be arranged in a coefficient array having a 1-D form using vertical scan. The vertical scan is sequentially performed on each of columns within the 2-D quantization matrix from the first column to the last column, and coefficients within each column can be scanned from the top to the bottom.

Figure 9:
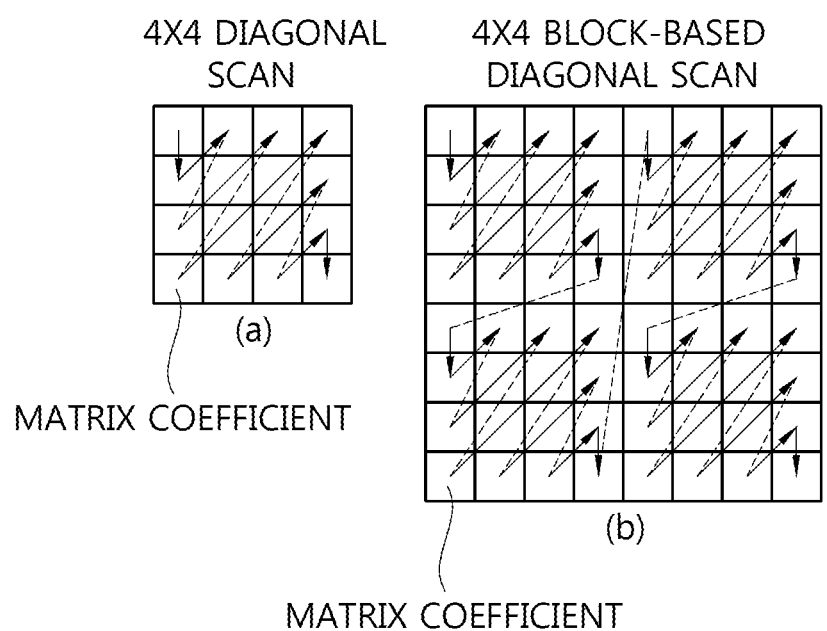
FIG. 9 is a diagram showing an example of block-based diagonal scan which can be applied to a quantization matrix having an 8×8 size in accordance with an embodiment of the present invention.

FIG. 9 is a diagram showing an example of block-based diagonal scan which can be applied to a quantization matrix having an 8×8 size in accordance with an embodiment of the present invention.

As shown in FIG. 9, coefficients within a 2-D quantization matrix having an 8×8 size can be arranged in a coefficient array having a 1-D form using diagonal scan based on a block having a 4×4 size. Here, the diagonal scan is performed on coefficients within each block having a 4×4 size, and the diagonal scan can also be applied to all the blocks each having a 4×4 size within the 2-D quantization matrix.

The direction of the diagonal scan can be from a down-left direction to an up-right direction as in FIG. 9. Or, the direction of the diagonal scan may be from an up-right direction to a down-left direction. The block-based diagonal scan shown in FIG. 9 shows an example of a method of performing up-right scan based on a block having a 4×4 size.

Figure 10:
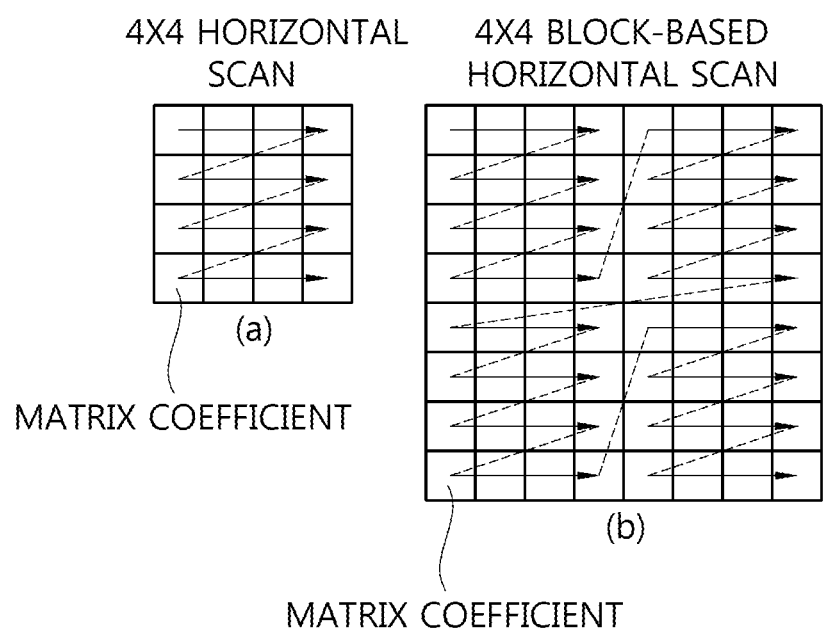
FIG. 10 is a diagram showing an example of block-based horizontal scan which can be applied to a quantization matrix having an 8×8 size in accordance with an embodiment of the present invention.

FIG. 10 is a diagram showing an example of block-based horizontal scan which can be applied to a quantization matrix having an 8×8 size in accordance with an embodiment of the present invention.

As shown in FIG. 10, coefficients within a 2-D quantization matrix having an 8×8 size can be arranged in a coefficient array having a 1-D form using horizontal scan based on a block having a 4×4 size. Here, the horizontal scan is performed on coefficients within each block having a 4×4 size, and the horizontal scan can also be applied to all the blocks each having a 4×4 size within the 2-D quantization matrix.

Figure 11:
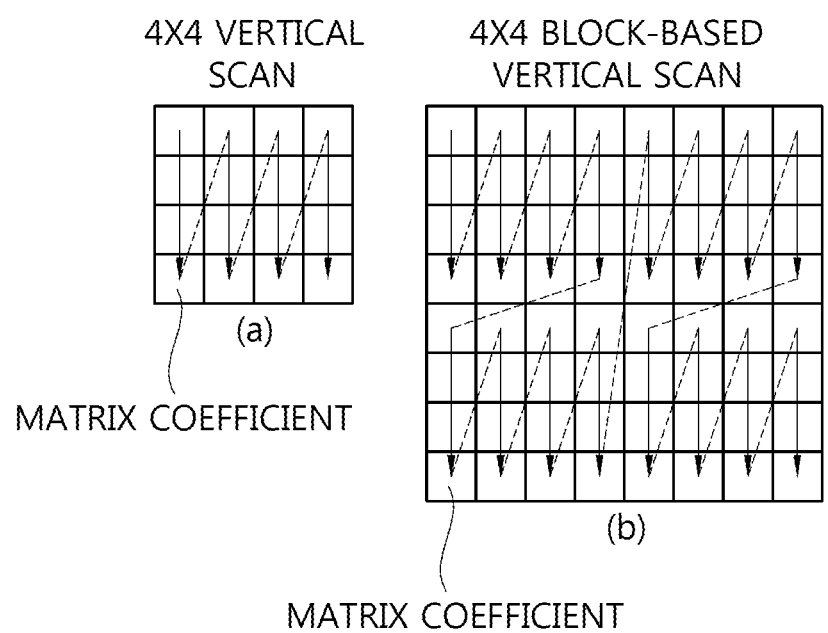
FIG. 11 is a diagram showing an example of block-based vertical scan which can be applied to a quantization matrix having an 8×8 size in accordance with an embodiment of the present invention.

FIG. 11 is a diagram showing an example of block-based vertical scan which can be applied to a quantization matrix having an 8×8 size in accordance with an embodiment of the present invention.

As shown in FIG. 11, coefficients within a 2-D quantization matrix having an 8×8 size can be arranged in a coefficient array having a 1-D form using vertical scan based on a block having a 4×4 size. Here, the vertical scan is performed on coefficients within each block having a 4×4 size, and the vertical scan can also be applied to all the blocks each having a 4×4 size within the 2-D quantization matrix.

Figure 12:
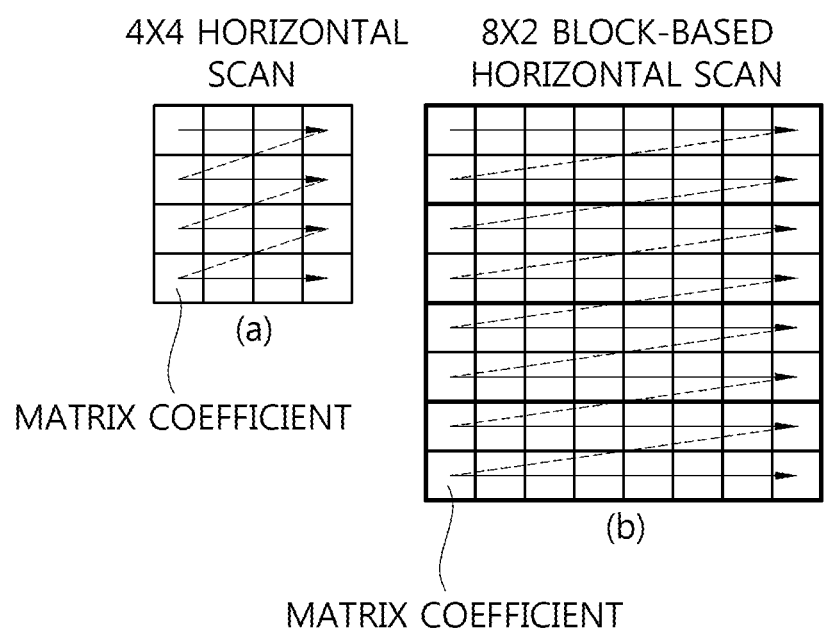
FIG. 12 is a diagram showing another example of block-based horizontal scan which can be applied to a quantization matrix having an 8×8 size in accordance with an embodiment of the present invention.

FIG. 12 is a diagram showing another example of block-based horizontal scan which can be applied to a quantization matrix having an 8×8 size in accordance with an embodiment of the present invention.

As shown in FIG. 12, coefficients within a 2-D quantization matrix having an 8×8 size can be arranged in a coefficient array having a 1-D form using horizontal scan based on a block having an 8×2 size. Here, the horizontal scan is performed on coefficients within each block having an 8×2 size, and the horizontal scan can also be applied to all the blocks each having an 8×2 size within the 2-D quantization matrix.

Figure 13:
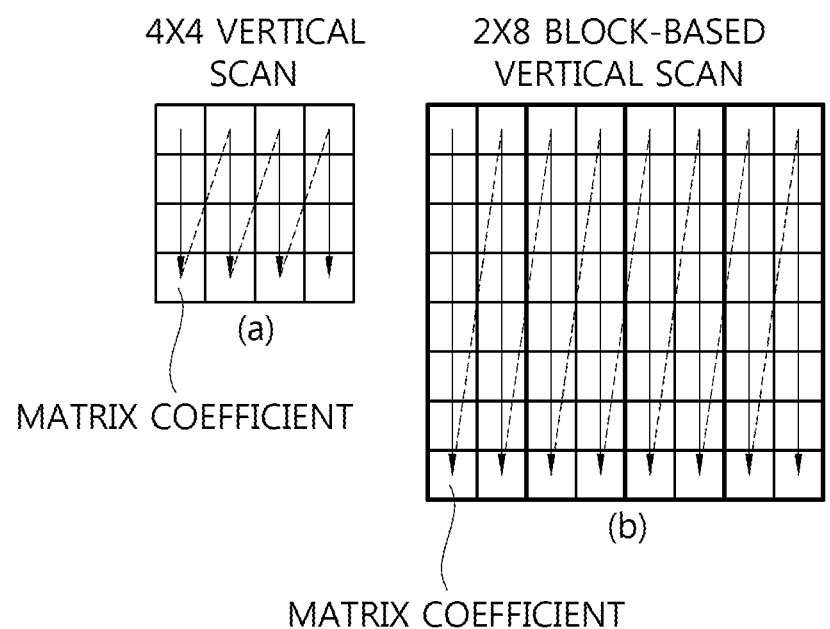
FIG. 13 is a diagram showing another example of block-based vertical scan which can be applied to a quantization matrix having an 8×8 size in accordance with an embodiment of the present invention.

FIG. 13 is a diagram showing another example of block-based vertical scan which can be applied to a quantization matrix having an 8×8 size in accordance with an embodiment of the present invention.

As shown in FIG. 13, coefficients within a 2-D quantization matrix having an 8×8 size can be arranged in a coefficient array having a 1-D form using vertical scan based on a block having a 2×8 size. Here, the vertical scan is performed on coefficients within each block having a 2×8 size, and the vertical scan can also be applied to all the blocks each having a 2×8 size.

Meanwhile, a block may be a sub-block divided from a specific block size. If the above-described block-based scan is used, sub-blocks within a specific block size can be scanned using a scan method, such as diagonal scan, vertical scan, or horizontal scan. For example, if block-based diagonal scan is used as in FIG. 9, a block having an 8×8 size can be divided into four sub-blocks each having a 4×4 size, all the sub-blocks each having a 4×4 size can be scanned using diagonal scan, and coefficients within each sub-block having a 4×4 size can be also be scanned using the diagonal scan.

The scan methods shown in FIGS. 6(a) to 13(a) can be used in a quantization matrix having a 4×4 size for a 4×4 transform coefficient block, and the scan methods shown in FIGS. 6(b) to 13(b) can be used in a quantization matrix having an 8×8 size or higher for 8×8/16×16/32×32 transform coefficient blocks. The scan methods shown in FIGS. 6 to 13 are illustrated as being applied to a quantization matrix having a maximum 8×8 size, but can be likewise applied to a quantization matrix having a size greater than an 8×8 size. Furthermore, the scan methods shown in FIGS. 6 to 13 can also be applied to a quantization matrix having a non-square form in addition to a quantization matrix having a square form.

Referring back to FIG. 5, the image encoding apparatus generates a difference value (e.g., scaling_list_delta_coef) between the quantization matrix coefficients based on the scanned quantization matrix coefficients at step S520. That is, the image encoding apparatus generates the difference value (e.g., scaling_list_delta_coef) between a current quantization matrix coefficient value and a previous quantization matrix coefficient within a coefficient array having a 1-D form using the above-described scan method. Here, the difference value can be calculated using DPCM.

The current quantization matrix coefficient can be the coefficient of a current quantization matrix to be encoded on the coefficient array having a 1-D form, and the previous quantization matrix coefficient can be a coefficient located in an array right before the current quantization matrix coefficient on the coefficient array having a 1-D form. Furthermore, a difference value for the first coefficient of a coefficient array having a 1-D form can be generated using a specific constant value because a previous quantization matrix coefficient to be predicted is not present. The specific constant value can be a value between, for example, 1~255, particularly, may be 8 or 16.

The image encoding apparatus encodes the difference value (e.g., scaling_list_delta_coef) between a current quantization matrix coefficient and a previous quantization matrix coefficient at step S530.

For example, the image encoding apparatus can encode the difference value (e.g., scaling_list_delta_coef) into an exponential-Golomb code. If the difference value (e.g., scaling_list_delta_coef) has sign information, the difference value (e.g., scaling_list_delta_coef) can be encoded into a signed exponential-Golomb code. Here, the difference value (e.g., scaling_list_delta_coef) can be a value limited between −128~127 and can be encoded into the value between −128~427.

Figure 14:
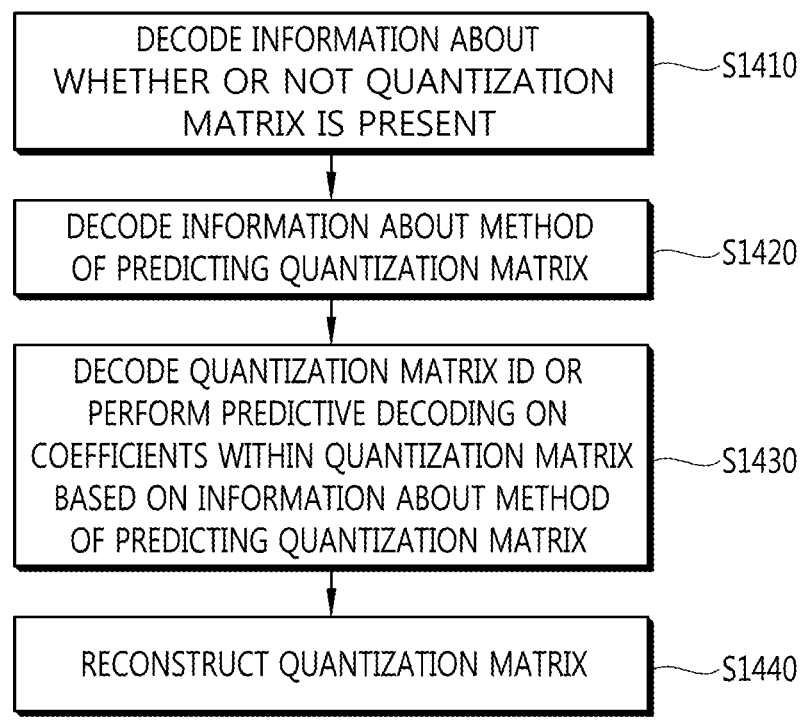
FIG. 14 is a flowchart schematically illustrating a method of decoding a quantization matrix in accordance with an embodiment of the present invention.

FIG. 14 is a flowchart schematically illustrating a method of decoding a quantization matrix in accordance with an embodiment of the present invention. The method of FIG. 14 can be performed by the image decoding apparatus of FIG. 2.

Referring to FIG. 14, the image decoding apparatus can decode information about whether or not a quantization matrix is present at step S1410. For example, the image decoding apparatus can decode information indicative of whether or not a quantization matrix is present from a parameter set. Here, the parameter set may be an adaptation parameter set.

For example, the image decoding apparatus can decode a flag (e.g., scaling_list_present_flag shown in Table 2), indicating whether or not a quantization matrix is present within a bit stream received from an encoder, from a parameter set. If a value of scaling_list_present_flag is 0, it indicates that a quantization matrix is not present. If a value of scaling_list_present_flag is 1, it indicates that an encoded quantization matrix is present. Here, if a quantization matrix is not present (i.e., scaling_list_present_flag=0), all quantization matrices can be determined to be default matrices.

The image decoding apparatus can decode information about a method of predicting a quantization matrix at step S1420. For example, the image decoding apparatus can decode information about a method of predicting a quantization matrix from a parameter set and determine the type of a method of predicting a quantization matrix based on the decoded information. Here, the parameter set may be an adaptation parameter set.

For example, the image decoding apparatus can decode a flag (e.g., scaling_list_pred_mode_flag shown in Table 2), indicating information about a quantization matrix prediction method received from an encoder, from a parameter set. If a value of scaling_list_pred_mode_flag is 1, the image decoding apparatus can decode quantization matrix coefficients using an exponential-Golomb code, inverse DPCM, or scan in order to predict the coefficients within the quantization matrix. If a value of scaling_list_pred_mode_flag is 0, the image decoding apparatus can determine the coefficient value of a quantization matrix to be decoded so that the quantization matrix to be decoded has the same coefficient value as a reference quantization matrix or determine the coefficient value of a quantization matrix to be decoded so that the quantization matrix to be decoded has the same coefficient value as a default matrix coefficient in order to perform prediction between quantization matrices. Here, the meaning that the quantization matrices have the same coefficient value may correspond to a quantization matrix prediction method for copying the coefficient value of a specific quantization matrix to that of a quantization matrix to be decoded.

The image decoding apparatus can decode a quantization matrix ID in order to perform prediction between quantization matrices or can perform predictive decoding on coefficients within the quantization matrix based on the information about a method of predicting a quantization matrix at step S1430.

For example, if it is determined that a quantization matrix to be decoded has the same coefficient value as a reference quantization matrix (e.g., scaling_list_pred_mode_flag=0) in order to perform prediction between quantization matrices according to a method of predicting a quantization matrix, the reference quantization matrix ID of the quantization matrix to be decoded can be decoded from a parameter set. Here, the parameter set may be an adaptation parameter set.

As in the example of the syntax element of Table 2, information (e.g., scaling_list_pred_matrix_id_delta) indicative of the reference quantization matrix ID of a quantization matrix to be decoded can be decoded from a parameter set. Here, the reference quantization matrix 'RefMatrixID' of the quantization matrix to be decoded can be determined using scaling_list_pred_matrix_id_delta indicative of the reference quantization matrix ID and matrixID indicative of the quantization matrix to be decoded. For example, the reference quantization matrix 'RefMatrixID' can be determined as in Equation 3.

$$RefMatrixID = matrixID - (1 + scaling\_list\_pred\_matrix\_id\_delta) \qquad \text{[Equation 3]}$$

The quantization matrix indicated by RefMatrixID that has been determined using a method, such as Equation 3, can be determined as the reference quantization matrix of the quantization matrix to be decoded, and the quantization matrix to be decoded can be set to have the same coefficient value as the reference quantization matrix. The meaning that the quantization matrix to be decoded is set to have the same coefficient value as the reference quantization matrix may correspond to a quantization matrix prediction method for copying the coefficient value of the reference quantization matrix indicated by RefMatrixID to the coefficient value of the quantization matrix to be decoded.

For another example, if it is determined that the quantization matrix to be decoded has the same coefficient value as a reference quantization matrix or a default matrix (e.g., scaling_list_pred_mode_flag=0) in order to perform prediction between quantization matrices according to the method of predicting a quantization matrix, information indicating the reference quantization matrix ID of the quantization matrix to be decoded and whether or not the default matrix is used can be decoded from a parameter set. Here, the parameter set may be an adaptation parameter set.

As in the example of the syntax element of Table 2, information (e.g., scaling_list_pred_matrix_id_delta) indicating the reference quantization matrix ID of a quantization matrix to be decoded and whether or not a default matrix is used can be decoded from a parameter set. Here, the reference quantization matrix 'RefMatrixID' of the quantization matrix to be decoded can be determined using scaling_list_pred_matrix_id_delta indicative of the reference quantization matrix ID and matrixID indicative of the quantization matrix to be decoded. For example, the reference quantization matrix 'RefMatrixID' can be determined as in Equation 4.

$$RefMatrixID = matrixID - scaling\_list\_pred\_matrix\_id\_delta \qquad \text{[Equation 4]}$$

If a value of RefMatrixID is identical with a value of matrixID, it is determined that a quantization matrix to be decoded has the same coefficient value as a default matrix that is defined in an encoder and a decoder. Here, the default matrix means a default matrix indicated by sizeID and matrixID. Furthermore, if a value of scaling_list_pred_matrix_id_delta is 0, it means that RefMatrixID has the same value as matrixID.

If RefMatrixID has a different value from matrixID, a quantization matrix indicated by RefMatrixID is determined as the reference quantization matrix of a quantization matrix to be decoded and the quantization matrix to be decoded is set to have the same coefficient value as the reference quantization matrix. The meaning that the quantization matrix to be decoded is set to have the same coefficient value as the reference quantization matrix may correspond to a quantization matrix prediction method for copying the coefficient value of the reference quantization matrix indicated by RefMatrixID to the coefficient value of the quantization matrix to be decoded.

For yet another example, if it is determined that an exponential-Golomb code, inverse DPCM, and scan are used (e.g., scaling_list_pred_mode_flag=1) in order to perform predictive decoding on coefficients within a quantization matrix according to the method of predicting a quantization matrix, a difference value between the previous quantization matrix coefficient and the current quantization matrix coefficient within the quantization matrix can be decoded from a parameter set. Here, the parameter set may be an adaptation parameter set.

As in the example of the syntax element of Table 5, if the size of a quantization matrix to be decoded is 16×16 (sizeID=2) or 32×32 (sizeID=3), information (e.g., scaling_list_dc_coef_minus8) indicative of a DC matrix coefficient value can be decoded from a parameter set. A value of scaling_list_dc_coef_minus8 can be limited to a value between −7~247 that can be represented by 8 bits and can be decoded as the value between −7~247 using a signed exponential-Golomb code. Here, the DC matrix coefficient value is subsequently calculated as a value of scaling_list_dc_coef_minus8+8, and the calculated value may be a value between 1~255.

Or, as in the example of the syntax element of Table 5, information (e.g., scaling_list_delta_coef) indicating a difference value between a previous quantization matrix coefficient and a current quantization matrix coefficient within a quantization matrix can be decoded from a parameter set. For example, if a default matrix is used, only one value of scaling_list_delta_coef can be decoded. Or, if a quantization matrix having a 4×4 size is to be decoded, a value of scaling_list_delta_coef can be decoded into a total of 16 values, that is, the number of coefficients within the quantization matrix having a 4×4 size. Or, if a quantization matrix used in a transform coefficient block having an 8×8 size or higher is to be decoded, a value of scaling_list_delta_coef can be decoded into a total of 64 values, that is, the number of coefficients within the quantization matrix having an 8×8 size. A method of predictive decoding quantization matrix coefficients using the difference value (e.g., scaling_list_delta_coef) between coefficients within a quantization matrix is described in detail with reference to FIG. 17.

Meanwhile, whether or not a default matrix is used can be determined using scaling_list_delta_coef used to calculate scaling_list_dc_coef_minus8 or nextCoef. For example, if a value of scaling_list_dc_coef_minus8 is decoded into −8, a quantization matrix to be decoded can be determined as a default matrix. If the first nextCoef value obtained by decoding a value of scaling_list_delta_coef is 0, a quantization matrix to be decoded can be determined as a default matrix.

The image decoding apparatus can reconstruct a quantization matrix at step S1440. Here, the image decoding apparatus can reconstruct a 2-D quantization matrix using up-sampling, interpolation, DC matrix coefficient substitution, or sub-sampling.

For example, in the case of a quantization matrix used in a square transform coefficient block having a 4×4, 8×8, 16×16, or 32×32 size, an arranged 2-D quantization matrix can be used without change when quantization/dequantization is performed, or an arranged 2-D quantization matrix can be reconstructed through up-sampling and used when quantization/dequantization is performed.

A 2-D quantization matrix QM having a 4×4 size can be used without change as a quantization matrix RQM used when dequantizing a transform coefficient block having a 4×4 size. This can be expressed as in Equation 5.

$$RQM(x,y)=QM(x,y) \text{ with } x=0, 1, \ldots, 3, y=0, 1, \ldots, 3 \quad \text{[Equation 5]}$$

An arranged 2-D quantization matrix QM having an 8×8 size can be used without change as a quantization matrix RQM used when dequantizing a transform coefficient block having an 8×8 size. This can be expressed as in Equation 6.

$$RQM(x,y)=QM(x,y) \text{ with } x=0, 1, \ldots, 7, y=0, 1, \ldots, 7 \quad \text{[Equation 6]}$$

A quantization matrix RQM used when dequantizing a transform coefficient block having a 16×16 size can be reconstructed into a quantization matrix having a 16×16 size by up-sampling an arranged 2-D quantization matrix QM having an 8×8 size. Here, a quantization matrix coefficient at a DC location, that is, at (0, 0), within the quantization matrix RQM can be replace with a value of scaling_list_dc_coef_minus8+8, that is, a DC matrix coefficient value. This can be expressed as in Equation 7.

$$RQM(x,y)=QM(x/F,y/F) \text{ with } x=0, 1, \ldots, 15, y=0, 1, \ldots, 15, F=2 \, RQM(0,0)=\text{scaling\_list\_dc\_coef\_minus8}+8 \quad \text{[Equation 7]}$$

A quantization matrix RQM used when dequantizing a transform coefficient block having a 32×32 size can be reconstructed into a quantization matrix having a 32×32 size by up-sampling an arranged 2-D quantization matrix QM having an 8×8 size. Here, a quantization matrix coefficient at a DC location, that is, at (0, 0), within the quantization matrix RQM can be replaced with a value of scaling_list_dc_coef_minus8+8, that is, a DC matrix coefficient value. This can be expressed as in Equation 8.

$$RQM(x,y)=QM(x/F,y/F) \text{ with } x=0, 1, \ldots, 31, y=0, 1, \ldots, 31, F=4 \, RQM(0,0)=\text{scaling\_list\_dc\_coef\_minus8}+8 \quad \text{[Equation 8]}$$

Figure 15:
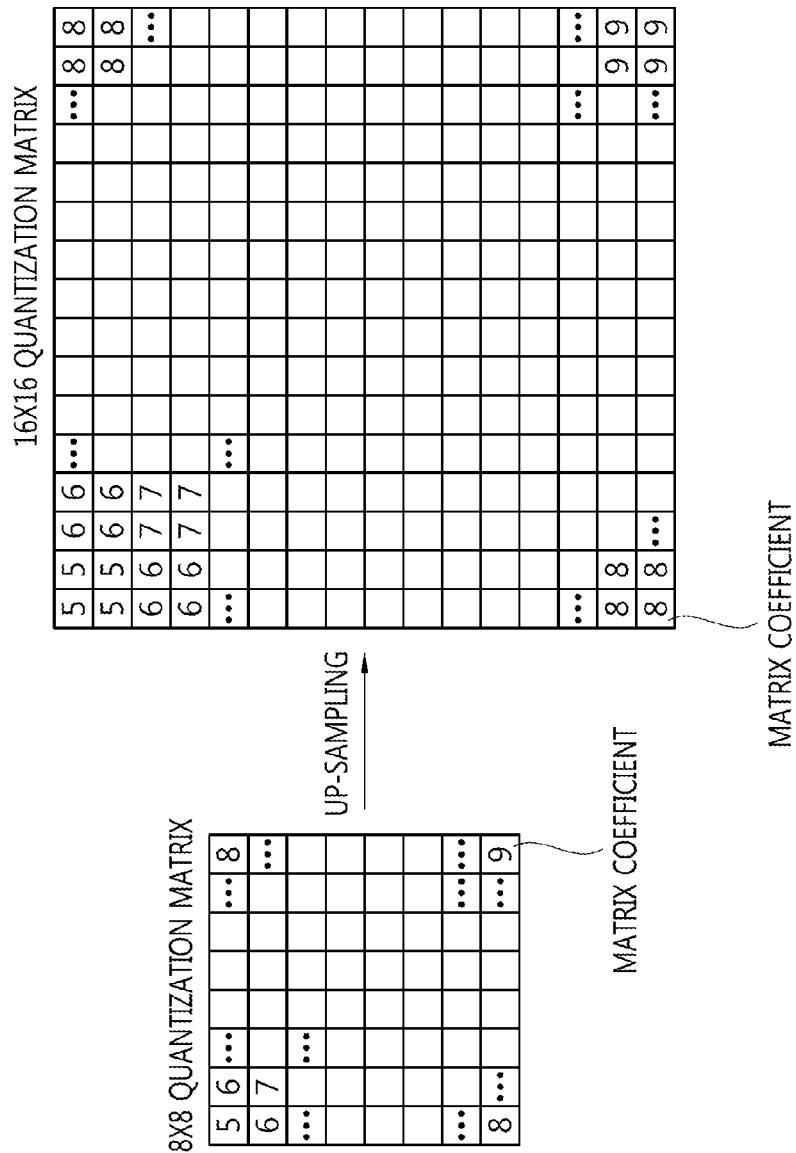
FIG. 15 is a diagram illustrating a method of up-sampling a quantization matrix to which the present invention can be applied.

A method of up-sampling a quantization matrix can be performed as in a method shown in FIG. 15. For example, as shown in FIG. 15, if a quantization matrix having an 8×8 size is up-sampled into a quantization matrix having a 16×16 size, a coefficient that must be up-sampled within the quantization matrix having a 16×16 size can be copied from the nearest coefficient. If the quantization matrix having an 8×8 size is up-sampled into a quantization matrix having a 32×32 size, a method, such as that of FIG. 15, can be used.

Here, the up-sampling method of copying a coefficient from the nearest coefficient may be called the nearest neighbor interpolation method or a 0th order interpolation method.

For another example, in the case of a quantization matrix used in a non-square transform coefficient block having a 16×4, 4×16, 32×8, or 8×32 size, an arranged 2-D quantization matrix can be reconstructed through sub-sampling (or down-sampling) and used when performing quantization/dequantization.

A quantization matrix RQM used when dequantizing a transform coefficient block having a 16×4 size can be reconstructed into a quantization matrix having a 16×4 size by sub-sampling a quantization matrix QM having a 16×16 size.

Figure 16:
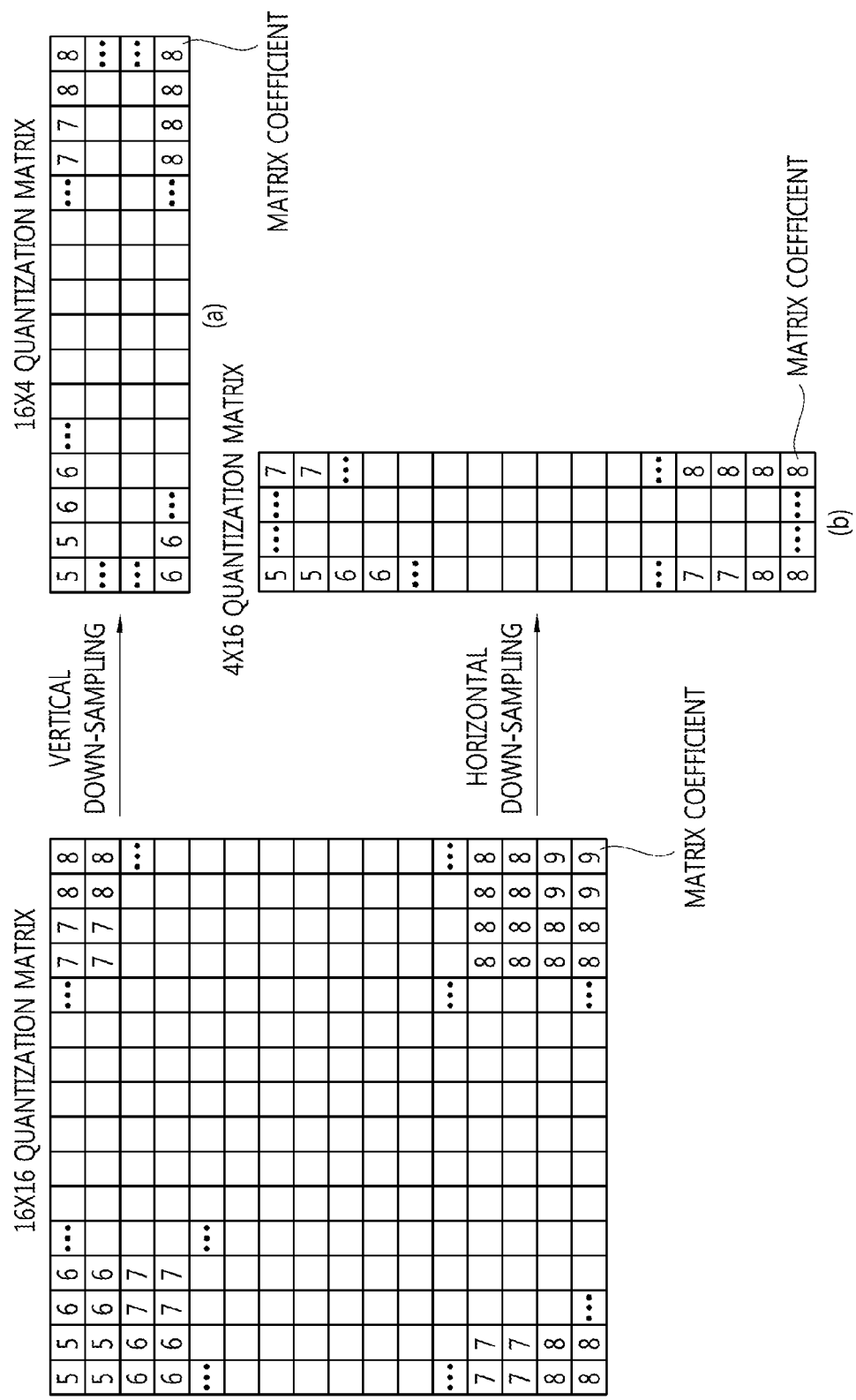
FIG. 16 is a diagram illustrating a method of sub-sampling a quantization matrix to which the present invention can be applied.

Here, a method of sub-sampling the quantization matrix QM can be performed according to a method, such as that shown in FIG. 16. For example, as shown in FIG. 16 (*a*), if a quantization matrix having a 16×16 size is sub-sampled into a quantization matrix having a 16×4 size, the quantization matrix having a 16×4 size can be derived by performing sub-sampling on a reconstructed quantization matrix having a 16×16 size in relation to a y location, that is, a row direction (i.e., vertical direction).

A process of reconstructing the quantization matrix having a 16×16 size into the quantization matrix having a 16×4 size through sub-sampling can be expressed as in Equation 9.

$$RQM(x,y)=QM(x,y*F) \text{ with } x=0, 1, \ldots, 15, y=0, 1, \ldots, 3, F=4 \qquad \text{[Equation 9]}$$

A quantization matrix RQM used when dequantizing a transform coefficient block having a 4×16 size can be reconstructed into a quantization matrix having a 4×16 size by sub-sampling a quantization matrix QM having a 16×16 size.

Here, a method of sub-sampling the quantization matrix QM can be performed according to a method, such as that shown in FIG. 16. For example, as shown in FIG. 16(*b*), if a quantization matrix having a 16×16 size is sub-sampled into a quantization matrix having a 4×16 size, a quantization matrix having a 4×16 size can be derived by performing sub-sampling on a reconstructed quantization matrix having a 16×16 size in relation to an x location, that is, a column direction (i.e., horizontal direction).

A process of reconstructing the quantization matrix having a 16×16 size into the quantization matrix having a 4×16 size through sub-sampling can be expressed as in Equation 10.

$$RQM(x,y)=QM(x*F,y) \text{ with } x=0,1, \ldots, 3, y=0, 1, \ldots, 15, F=4 \qquad \text{[Equation 10]}$$

A quantization matrix RQM used when dequantizing a transform coefficient block having a 32×8 size can be reconstructed into a quantization matrix having a 32×8 size by sub-sampling a quantization matrix QM having a 32×32 size. Here, as in a method, such as that shown in FIG. 16(*a*), the quantization matrix having a 32×8 size can be derived by sub-sampling a reconstructed quantization matrix having a 32×32 size in relation to a y location, that is, a row direction (i.e., vertical direction).

A process of reconstructing the quantization matrix having a 32×32 size into the quantization matrix having a 32×8 size through sub-sampling can be expressed as in Equation 11.

$$RQM(x,y)=QM(x,y*F) \text{ with } x=0, 1, \ldots, 31, y=0, 1, \ldots, 7, F=4 \qquad \text{[Equation 11]}$$

A quantization matrix RQM used when dequantizing a transform coefficient block having an 8×32 size can be reconstructed into a quantization matrix having an 8×32 size by sub-sampling a quantization matrix QM having a 32×32 size. Here, as in a method, such as that shown in FIG. 16(*b*), the quantization matrix having an 8×32 size can be derived by performing sub-sampling on a reconstructed quantization matrix having a 32×32 size in relation to an x location, that is, a column direction (i.e., horizontal direction).

A process of reconstructing the quantization matrix having a 32×32 size into the quantization matrix having an 8×32 size through sub-sampling can be expressed as in Equation 12.

$$RQM(x,y)=QM(x*F,y) \text{ with } x=0, 1, \ldots, 7, y=0, 1, \ldots, 31, F=4 \qquad \text{[Equation 12]}$$

Meanwhile, a default matrix can be subject to up-sampling or sub-sampling and used when performing quantization/dequantization. For example, a default matrix having an 8×8 size can be reconstructed into a quantization matrix having a 16×16 or 32×32 size through up-sampling.

A default matrix RQM used when dequantizing a transform coefficient block having a 16×16 size can be reconstructed into a quantization matrix having a 16×16 size by up-sampling a default matrix DQM having an 8×8 size using a method, such as that shown in FIG. 15. This can be expressed as in Equation 13.

$$RQM(x,y)=DQM(x/F,y/F) \text{ with } x=0, 1, \ldots, 15, y=0, 1, \ldots, 15, F=2 \qquad \text{[Equation 13]}$$

A default matrix RQM used when dequantizing a transform coefficient block having a 32×32 size can be reconstructed into a quantization matrix having a 32×32 size by up-sampling a default matrix DQM having an 8×8 size using a method, such as that shown in FIG. 15. This can be expressed as in Equation 14.

$$RQM(x,y)=DQM(x/F,y/F) \text{ with } x=0, 1, \ldots, 31, y=0, 1, \ldots, 31, F=4 \qquad \text{[Equation 14]}$$

If a default matrix having an 8×8 size is reconstructed into a quantization matrix having a 16×16 or 32×32 size by performing up-sampling on the default matrix having an 8×8 size as described above, a memory space necessary to store default matrices in an encoder and a decoder can be reduced. That is, the storage space of the encoder and the decoder can be reduced because the default matrix having an 8×8 size has only to be stored in the memory instead of the default matrix having a 16×16 size and/or a 32×32 size.

In Equation 5 to Equation 14, x can be a value indicative of x coordinates of coefficients within a 2-D quantization matrix, and y can be a value indicative of y coordinates within coefficients within the 2-D quantization matrix.

Figure 17:
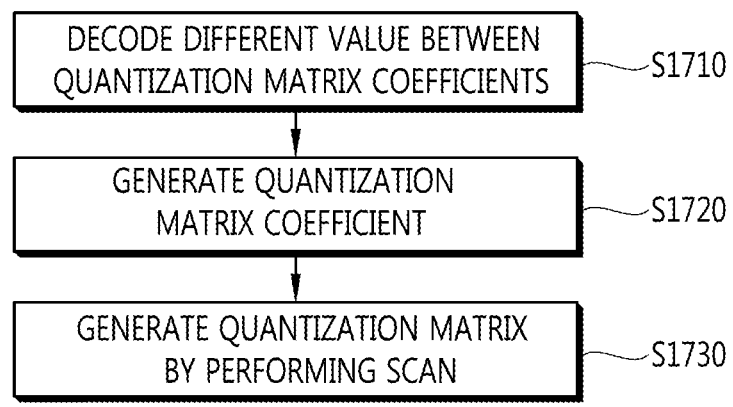
FIG. 17 is a flowchart schematically illustrating a method of predictive decoding quantization matrix coefficients in accordance with an embodiment of the present invention.

FIG. 17 is a flowchart schematically illustrating a method of predictive decoding quantization matrix coefficients in accordance with an embodiment of the present invention. The method of FIG. 17 can be performed by the image decoding apparatus of FIG. 2. Furthermore, the method of FIG. 17 can correspond to the process of predictive decoding quantization matrix coefficients based on the difference value 'scaling_list_delta_coef' between coefficients within a quantization matrix at step S1430 of FIG. 14.

Referring to FIG. 17, the image decoding apparatus decodes a difference value (e.g., scaling_list_delta_coef) between quantization matrix coefficients at step S1710.

For example, the image decoding apparatus can decode the difference value (e.g., scaling_list_delta_coef) between the quantization matrix coefficients using an exponential-Golomb code.

The difference value (e.g., scaling_list_delta_coef) can be a value limited between −128~127. Here, the difference value (e.g., scaling_list_delta_coef) can be decoded into the value between −128~127 using a signed exponential-Golomb code because it has sign information.

The image decoding apparatus generates a quantization matrix coefficient based on the decoded difference value (e.g., scaling_list_delta_coef) at step S1720.

The decoded difference value (e.g., scaling_list_delta_coef) can be stored in a coefficient array having a 1-D form or a matrix having a 2-D form in order of decoding. Accordingly, the image decoding apparatus can add the decoded difference value (e.g., scaling_list_delta_coef) between a current quantization matrix coefficient and a previous quantization matrix coefficient within the coefficient array having a 1-D form or the matrix having a 2-D form and reconstruct a quantization matrix coefficient using the added value. Here, the reconstructed quantization matrix coefficient can be calculated using inverse DPCM.

The current quantization matrix coefficient can be a coefficient value of a current quantization matrix to be decoded within a quantization array having a 1-D form or a 2-D matrix that will be decoded, and the previous quantization matrix coefficient can be a coefficient located right before an array or matrix order of the current quantization matrix coefficient within the quantization array having a 1-D form or the 2-D matrix that will be decoded.

Furthermore, the first coefficient of a quantization matrix can be reconstructed using a specific constant value because a previous quantization matrix coefficient to be predicted is not present. The specific constant value can be a value between, for example, 1~255, particularly, may be 8 or 16. Accordingly, the reconstructed quantization matrix coefficient can have the value between 1~255.

For example, as in Table 5, the image decoding apparatus can add a decoded difference value (e.g., scaling_list_delta_coef) and a previous quantization matrix coefficient and decode nextCoef or scalingList[i], that is, a current quantization matrix coefficient using the added value. Here, 'i' can be an index value indicating a location (or order) within a quantization array having a 1-D form.

The image decoding apparatus scans the reconstructed quantization matrix coefficients and arranges the scanned quantization matrix coefficients in a quantization matrix at step S1730.

decoding apparatus may determine a method of scanning quantization matrix coefficients according to specific conditions.

Meanwhile, in the process of decoding a quantization matrix in accordance with an embodiment of the present invention, an initialization process for zigzag scan can be avoided.

For example, if the block-based diagonal scan method in accordance with an embodiment of the present invention is applied to a default matrix having an 8×8 size that is defined in an encoder and a decoder that may be used in a transform coefficient block having an 8×8, 16×16, or 32×32 size, quantization matrix coefficients can be rearranged according to array indices, such as those shown in Table 6. Table 6 shows the coefficient values of a default matrix having an 8×8 size according to the size of a transform coefficient block, prediction mode, and a color component.

TABLE 6

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[1 ... 2][0 ... 2][i] ScalingList[3][0][i] | 16 | 16 | 16 | 16 | 16 | 16 | 16 | 16 | 16 | 16 | 16 | 17 | 16 | 18 | 18 | 21 |
| ScalingList[1 ... 2][3 ... 5][i] ScalingList[3][1][i] i-16 | 16 | 16 | 16 | 16 | 16 | 16 | 16 | 16 | 16 | 16 | 17 | 17 | 17 | 18 | 18 | 20 |
| ScalingList[1 ... 2][0 ... 2][i] ScalingList[3][0][i] | 17 | 18 | 17 | 21 | 19 | 20 | 24 | 22 | 22 | 24 | 25 | 25 | 27 | 29 | 31 | 36 |
| ScalingList[1 ... 2][3 ... 5][i] ScalingList[3][1][i] i-32 | 17 | 18 | 18 | 20 | 20 | 20 | 24 | 24 | 24 | 24 | 25 | 25 | 25 | 28 | 28 | 33 |
| ScalingList[1 ... 2][0 ... 2][i] ScalingList[3][0][i] | 17 | 17 | 18 | 20 | 19 | 21 | 24 | 22 | 22 | 24 | 27 | 25 | 25 | 31 | 29 | 36 |
| ScalingList[1 ... 2][3 ... 5][i] ScalingList[3][1][i] i-48 | 17 | 18 | 18 | 20 | 20 | 20 | 24 | 24 | 24 | 24 | 25 | 25 | 25 | 28 | 28 | 33 |
| ScalingList[1 ... 2][0 ... 2][i] ScalingList[3][0][i] | 30 | 35 | 35 | 41 | 44 | 41 | 47 | 54 | 54 | 47 | 65 | 70 | 65 | 88 | 88 | 115 |
| ScalingList[1 ... 2][3 ... 5][i] ScalingList[3][1][i] | 25 | 28 | 28 | 33 | 33 | 33 | 41 | 41 | 41 | 41 | 54 | 54 | 54 | 71 | 71 | 91 |

For example, the image decoding apparatus can scan the reconstructed quantization matrix coefficients using diagonal scan, horizontal scan, vertical scan, block-based diagonal scan, block-based horizontal scan, and block-based vertical scan, such as those shown in FIGS. 6 to 13. The scan method has been described above with reference to FIGS. 6 to 13, and thus a detailed description thereof is omitted. Here, the image decoding apparatus can scan the reconstructed quantization matrix coefficients in reverse order to scanning the quantization matrix of an image encoding apparatus and arrange the scanned quantization matrix coefficients in a 2-D quantization matrix. Here, the reconstructed quantization matrix coefficients can be arranged in the 2-D quantization matrix in the state in which a 1-D array is present.

For example, the image decoding apparatus can scan quantization matrix coefficients using a scan method signaled by an image encoding apparatus. Here, the image encoding apparatus can scan quantization matrix coefficients using one of the scan methods, such as those shown in FIGS. 6 to 13, and signal information about the scanned quantization matrix coefficients. In another embodiment, the image Referring to Table 6, 'i' indicates scan order, ScalingList [sizeID][matrixID][i] indicate sizeID, matrixID, and a default matrix coefficient indicated by 'i'. sizeID can be a value indicative of the size of a transform coefficient block or the size of a quantization matrix as in Table 3, and matrixID can be a value indicative of a quantization matrix ID according to prediction mode and a color component as in Table 4.

If the block-based diagonal scan in accordance with an embodiment of the present invention is applied hereinafter, a method of reconstructing a quantization matrix having a 4×4, 8×8, 16×16, or 32×32 size using ScalingList[sizeID] [matrixID][i] is described below. Here, the reconstructed quantization matrix can be represented by ScalingFactor [sizeID][MatrixID][x][y], and the reconstructed quantization matrix may mean an array of ScalingFactor according to sizeID and MatrixID.

The element 'ScalingFactor[0][MatrixID][0]H' of a quantization matrix having a 4×4 size can be derived as in Equation 15.

$$ScalingFactor[0][MatrixID][0][y*4+x] = ScalingList[0][MatrixID][i] \text{ with } i=0.15 \text{ and } MatrixID=0.5 \quad [\text{Equation 15}]$$

In Equation 15, x=DiagScan[i][0] and y=DiagScan[i][1]. Here, DiagScan[ ][ ] may be a diagonal scan method, such as that shown in FIG. 9(a), and may be an array generated by inputting 4 as a value of a block width 'blkWidth' and 8 as a value of a block height 'blkHeight' to an up-right diagonal scanning array initialization process.

The element 'ScalingFactor[1][MatrixID][0][ ]' of a quantization matrix having an 8×8 size can be derived as in Equation 16.

ScalingFactor[1][MatrixID][0][y*8+x]=ScalingList[1][MatrixID][i] with i=0..63 and MatrixID=0..5  [Equation 16]

In Equation 16, x=DiagScan[i][0] and y=DiagScan[i][1]. Here, DiagScan[ ][ ] can be a block-based diagonal scan method, such as that shown in FIG. 9(b), and may be an array generated by inputting 8 as a value of a block width 'blkWidth' and 8 as a value of a block height 'blkHeight' to an up-right diagonal scanning array initialization process.

The element 'ScalingFactor[2][MatrixID][0][ ]' of a quantization matrix having a 16×16 size can be derived as in Equation 17. Furthermore, the element of the quantization matrix having a 16×16 size that is located at (0,0) within the quantization matrix can be derived as in Equation 18.

ScalingFactor[2][MatrixID][0][(y*2+j)*16+(x*2+k)]= ScalingList[2][MatrixID][i] with i=0..63, j=0..1, k=0..1 and MatrixID=0..5  [Equation 17]

In Equation 17, x=DiagScan[i][0] and y=DiagScan[i][1]. Here, DiagScan[ ][ ] can be a block-based diagonal scan method, such as that shown in FIG. 9(b) and can be an array generated by inputting 8 as a value of a block width 'blkWidth' and 8 as a value of a block height 'blkHeight' to an up-right diagonal scanning array initialization process.

ScalingFactor[2][MatrixID][0][0]=scaling_list_dc_coef_minus8[0][MatrixID]+8 with MatrixID=0..5  [Equation 18]

The element ScalingFactor[3][MatrixID][0][ ] of a quantization matrix having a 32×32 size can be derived as in Equation 19. Furthermore, the element of the quantization matrix located at (0,0) within the quantization matrix having a 32×32 size can be derived as in Equation 20.

ScalingFactor[3][MatrixID][0][(y*4+j)*32+(x*4+k)]= ScalingList[3][MatrixID][i] with i=0..63, j=0..3, k=0..3 and MatrixID=0..1  [Equation 19]

In Equation 19, x=DiagScan[i][0] and y=DiagScan[i][1]. Here, DiagScan[ ][ ] can be a block-based diagonal scan method, such as that shown in FIG. 9(b), and sPos, that is, an array index at the up right side, can be an array generated by inputting 8 as a value of a block width 'blkWidth' and 8 as a block height 'blkHeight' to an up-right diagonal scanning array initialization process.

ScalingFactor[3][MatrixID][0][0]=scaling_list_dc_coef_minus8[1][MatrixID]+8 with MatrixID=0..1  [Equation 20]

The above-described up-right diagonal scanning array initialization process can be performed as follows.

Here, the block width 'blkWidth' and the block height 'blkHeight' can be the inputs, and an array 'DiagScan[sPos][sComp]' can be the output. The array index 'sPos' can be a value between 0 and '(blkWidthSize*blkHeightSize)−1', and it indicates a scan location. For example, if an array index 'sComp' is 0, it indicates a horizontal component and if an array index 'sComp' is 1, it indicates a vertical component. The array 'DiagScan[sPos][sComp]' can be derived as follows depending on the block width 'blkWidth' and the block height 'blkHeight'.

If the block width 'blkWidth' is smaller than 8 and the block height 'blkHeight' is smaller than 8, the up-right diagonal scanning array initialization process is performed as in Table 7 and the array 'DiagScan[sPos][sComp]' can be derived. If not (e.g., the block width 'blkWidth' is greater than 4 and the block height 'blkHeight' is greater than 4), the up-right diagonal scanning array initialization process can be performed as in Table 8 and the array 'DiagScan[sPos][sComp]' can be derived.

TABLE 7

```
i = 0
x = 0
y = 0
stopLoop = FALSE
while( !stopLoop ) {
    while( y >= 0 ) {
        if( x < blkWidth && y < blkHeight ) {
            DiagScan [ i ][ 0 ] = x
            DiagScan [ i ][ 1 ] = y
            i++
        }
        y - -
        x ++
    }
    y = x
    x = 0
    if( i >= blkWidth * blkHeight )
        stopLoop = TRUE
}
```

TABLE 8

```
x_off = 0
y_off = 0
i_off = 0
stopLoopSubblocks = FALSE
while( !stopLoopSubblocks ) {
    i = 0
    x = 0
    y = 0
    stopLoop = FALSE
    while( !stopLoop ) {
        while( y >= 0 ) {
            if( x < 4 && y < 4 ) {
                DiagScan [i + i_off ][ 0 ]= x + x_off
                DiagScan [i + i_off ][ 1 ]= y + y_off
                i ++
            }
            y - -
            x ++
        }
        y = x
        x = 0
        if( i >= 16 )
            stopLoop = TRUE
    }
    i_off = i_off + 16
    if( i_off >= blkWidth * blkHeight )
        stopLoopSubblocks = TRUE
    else
        do {
            y_off = y_off − 4
            x_off = x_off + 4
            if( y_off < 0 ) {
                y_off = x_off
                x_off = 0
            }
        }while( !( x_off < blkWidth && y_off < blkHeight ) )
}
```

A method of reconstructing a quantization matrix having a 4×4, 8×8, 16×16, or 32×32 size when the block-based diagonal scan method in accordance with an embodiment of the present invention is applied has been described, but the present invention is not limited to the block-based diagonal scan method. For example, the quantization matrix having a 4×4, 8×8, 16×16, or 32×32 size can be reconstructed using diagonal scan, horizontal scan, vertical scan, block-based diagonal scan, block-based horizontal scan, and block-based vertical scan, such as those shown in FIGS. 6 to 13. Furthermore, a quantization matrix reconstructed using this method is used when quantization/dequantizion is performed in an encoder and used when dequantizion is performed in a decoder.

In accordance with the aforementioned embodiments, a transform coefficient level is generated using a quantization matrix in a transform coefficient when quantization is performed in an encoder, and a transform coefficient is generated using a quantization matrix in a transform coefficient level when dequantization is performed in a decoder. In the present invention, however, both the transform coefficient and the transform coefficient level have been commonly designated as a transform coefficient.

In the aforementioned embodiments, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims. Accordingly, the present invention should be construed as covering all modifications or variations derived from the meaning and scope of the appended claims and their equivalents.

The invention claimed is:

1. A video decoding method, comprising:
   decoding information on a quantization matrix; and
   reconstructing a quantization matrix based on the information on the quantization matrix,
   wherein the information on the quantization matrix includes at least one of information indicating a prediction method of the quantization matrix, information on a reference quantization matrix identifier of the quantization matrix, information representing a DC value of the quantization matrix, and information representing a difference value between quantization matrix coefficients,
   wherein the reconstructing of the quantization matrix includes,
      deriving a quantization matrix coefficient by using the information representing a difference value between the quantization matrix coefficients, and
      arranging the quantization matrix coefficients in the quantization matrix by up-right diagonally scanning the quantization matrix coefficients.

2. The video decoding method of claim 1, wherein when a size of a transform coefficient block in which the quantization matrix is used is 16×16 or 32×32, the quantization matrix is reconstructed by using the information representing the DC value of the quantization matrix.

3. The video decoding method of claim 1, wherein the information representing the DC value of the quantization matrix is decoded as a value of −7 to 247.

4. The video decoding method of claim 1, wherein the information representing a difference value between the quantization matrix coefficients is a difference value between a current quantization matrix coefficient and a previous quantization matrix coefficient decoded before the current quantization matrix coefficient, and
   the quantization matrix coefficient is derived by adding the previous quantization matrix coefficient to the difference value between the quantization matrix coefficients for the current quantization matrix coefficient.

5. The video decoding method of claim 1,
   wherein when the quantization matrix is used in a transform coefficient block of 4×4 size, an up-right diagonal scan of 4×4 size is performed on the quantization matrix coefficients, and
   when the quantization matrix is used in a transform coefficient block having one size of 8×8, 16×16, and 32×32, an up-right diagonal scan of 8×8 size is performed on the quantization matrix coefficients.

* * * * *